United States Patent [19]
Fischer

[11] Patent Number: 4,785,394
[45] Date of Patent: Nov. 15, 1988

[54] FAIR ARBITRATION TECHNIQUE FOR A SPLIT TRANSACTION BUS IN A MULTIPROCESSOR COMPUTER SYSTEM

[75] Inventor: Michael A. Fischer, San Antonio, Tex.

[73] Assignee: Datapoint Corporation, San Antonio, Tex.

[21] Appl. No.: 909,773

[22] Filed: Sep. 19, 1986

[51] Int. Cl.⁴ ............................................. G06F 13/14
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,997,896 | 12/1976 | Cassarino, Jr. et al. | 364/200 |
| 4,038,644 | 7/1977 | Duke et al. | 364/900 |
| 4,229,791 | 10/1980 | Levy et al. | 364/200 |
| 4,263,648 | 4/1981 | Stafford et al. | 364/200 |
| 4,300,194 | 11/1981 | Bradley et al. | 364/200 |
| 4,373,183 | 2/1983 | Means et al. | 364/200 |
| 4,375,639 | 3/1983 | Johnson, Jr. | 364/200 |

*Primary Examiner*—Gareth D. Shaw
*Assistant Examiner*—Kevin A. Kriess
*Attorney, Agent, or Firm*—John R. Ley

[57] ABSTRACT

An arbitration techique for a split transaction bus of a computer system obtains higher data throughput as a result of giving responders (e.g. memories) absolute priority over initiators (e.g. processors and I/O adapters), as a result of assigning all responders a higher priority than any initiator. Precedence is also given to retrying initiators which failed to complete a transaction because the module to which the transfer was addressed was busy. The requests from non-retrying initiators are temporarily rescinded to give precedence to the requests from retrying initiators. There is an absolute limit or bound to the number of requests which a retrying module may make before it is granted mastership of the bus to accomplish its transfer. To accomplish test and set and memory scrub transactions with a minimum time loss, the bus of the computer system creates a null conductivity cycle immediately following the cycle in which the address of the memory location to be tested and set or scrubbed is transferred.

22 Claims, 19 Drawing Sheets

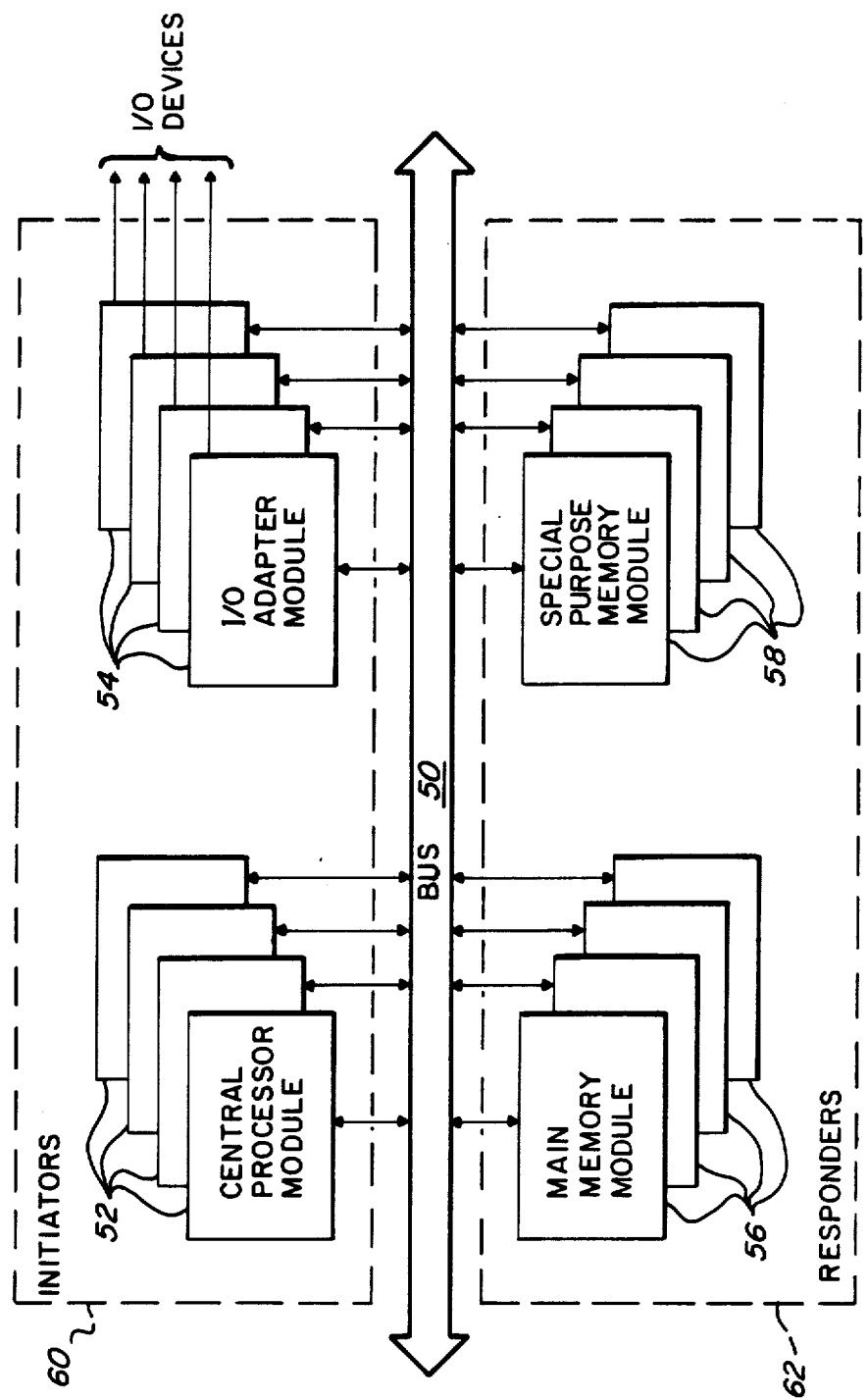

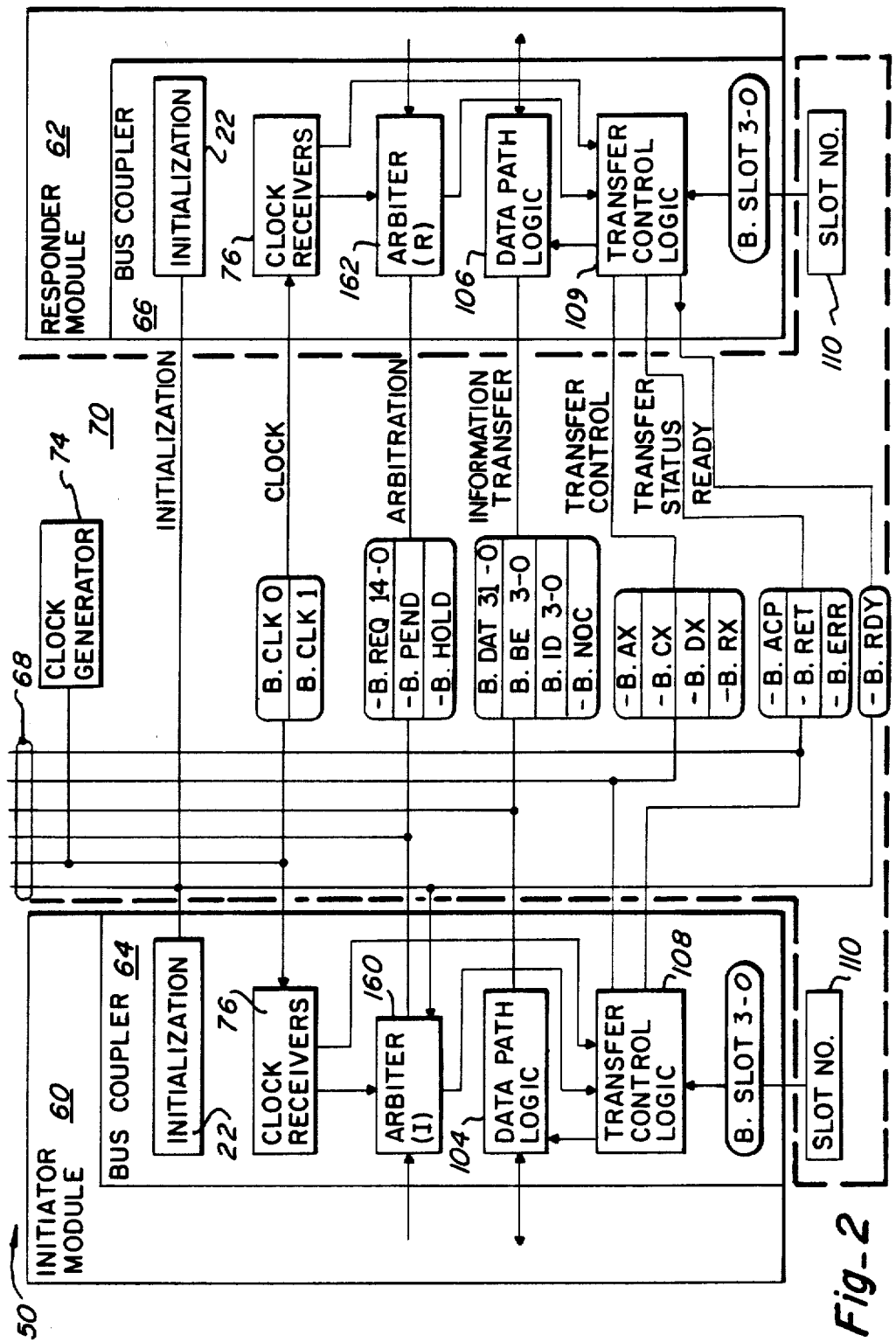
Fig_2

| Fig | Signal |
|---|---|
| Fig_3A | B. CLK I |
| Fig_3B | B. CLK O |
| Fig_3C | B0 |
| Fig_3D | B1 |
| Fig_3E | B2 |
| Fig_3F | B3 |
| Fig_3G | BUS STATE / BUS CYCLE |
| Fig_3H | INFO TRANSFER |
| Fig_3I | TRANSFER CONTROL |
| Fig_3J | TRANSFER STATUS |
| Fig_3K | -B. RDY |
| Fig_3L | -B. REQ |
| Fig_3M | -B. PEND |
| Fig_3N | -B. HOLD |

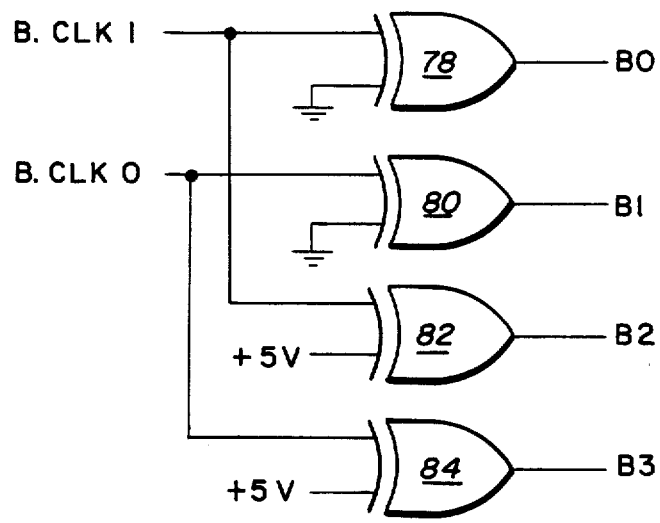
Fig_4
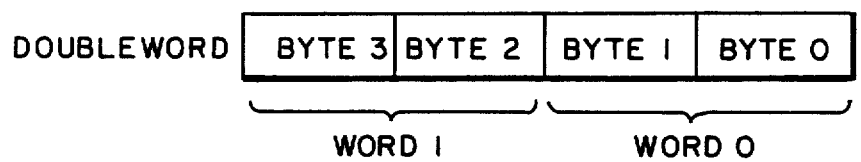
Fig_5A
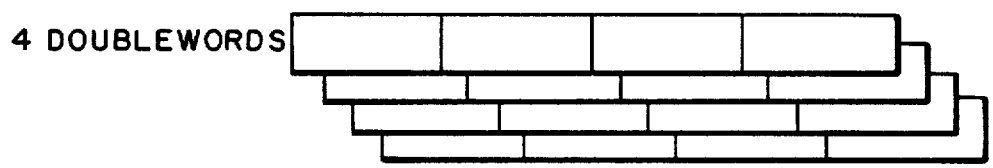
Fig_5B

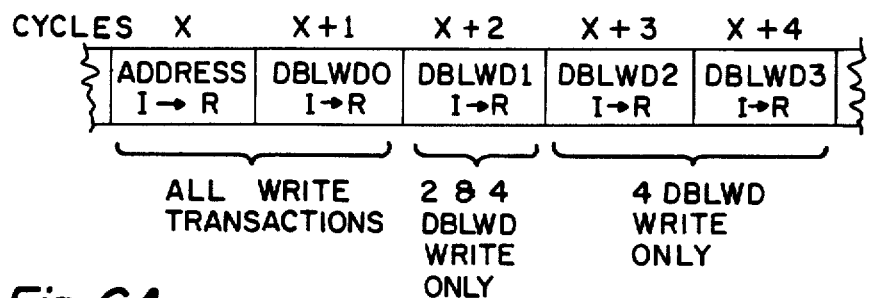
Fig_6A DATA WRITE TRANSACTIONS
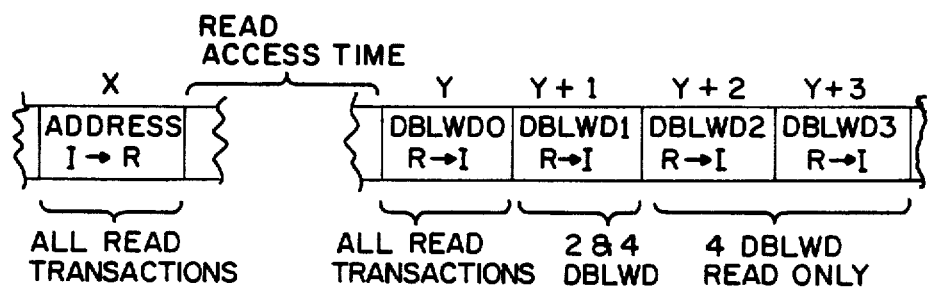
Fig_6B DATA READ TRANSACTIONS
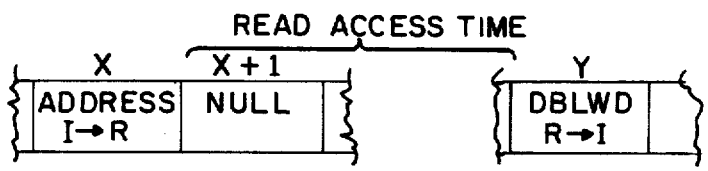
Fig_6C TEST & SET AND MEMORY SCRUB TRANSACTIONS
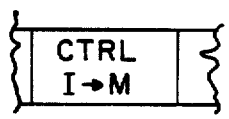
Fig_6D CONTROL WRITE TRANSACTION
Fig_6E CONTROL READ TRANSACTION

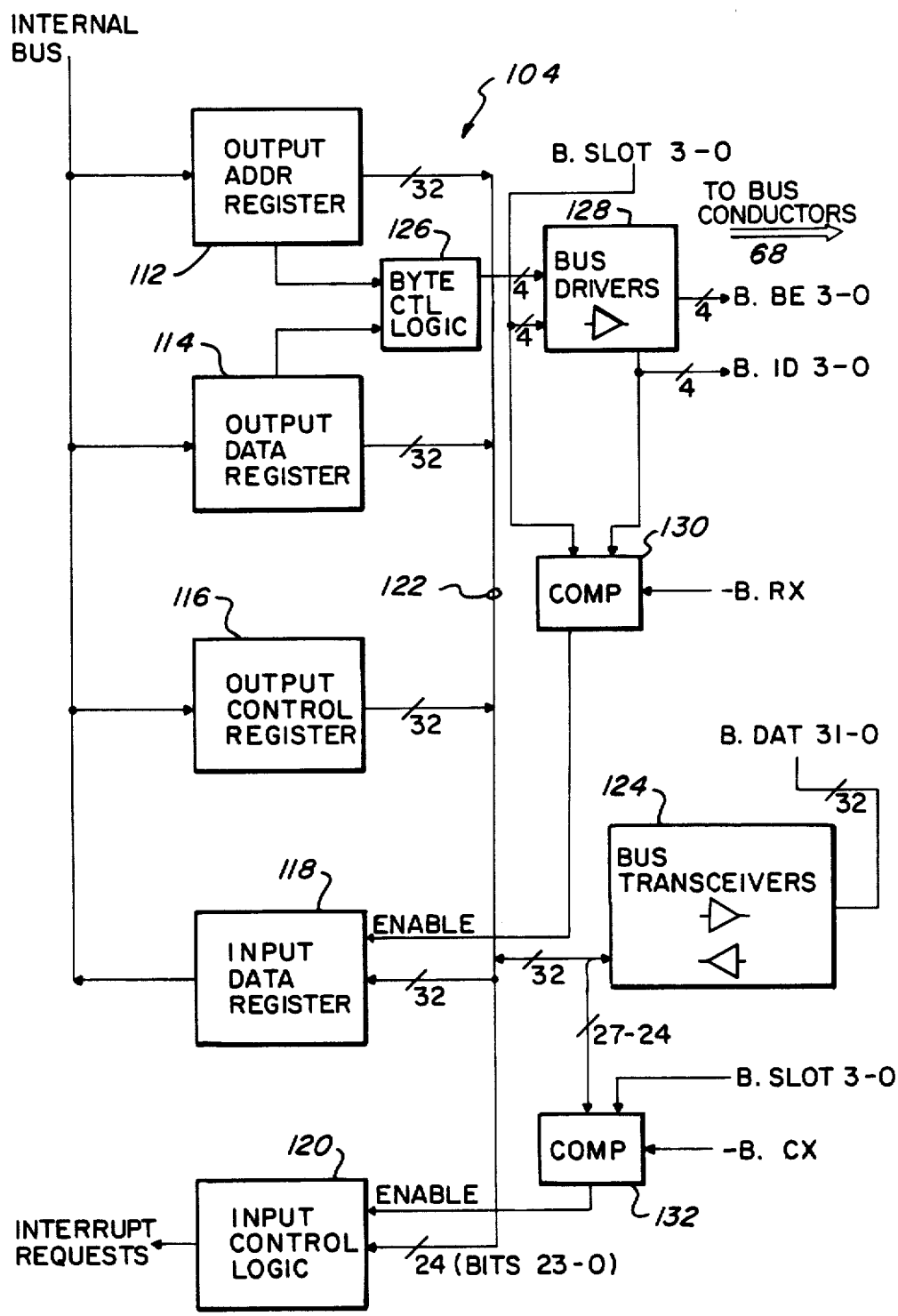
Fig_8

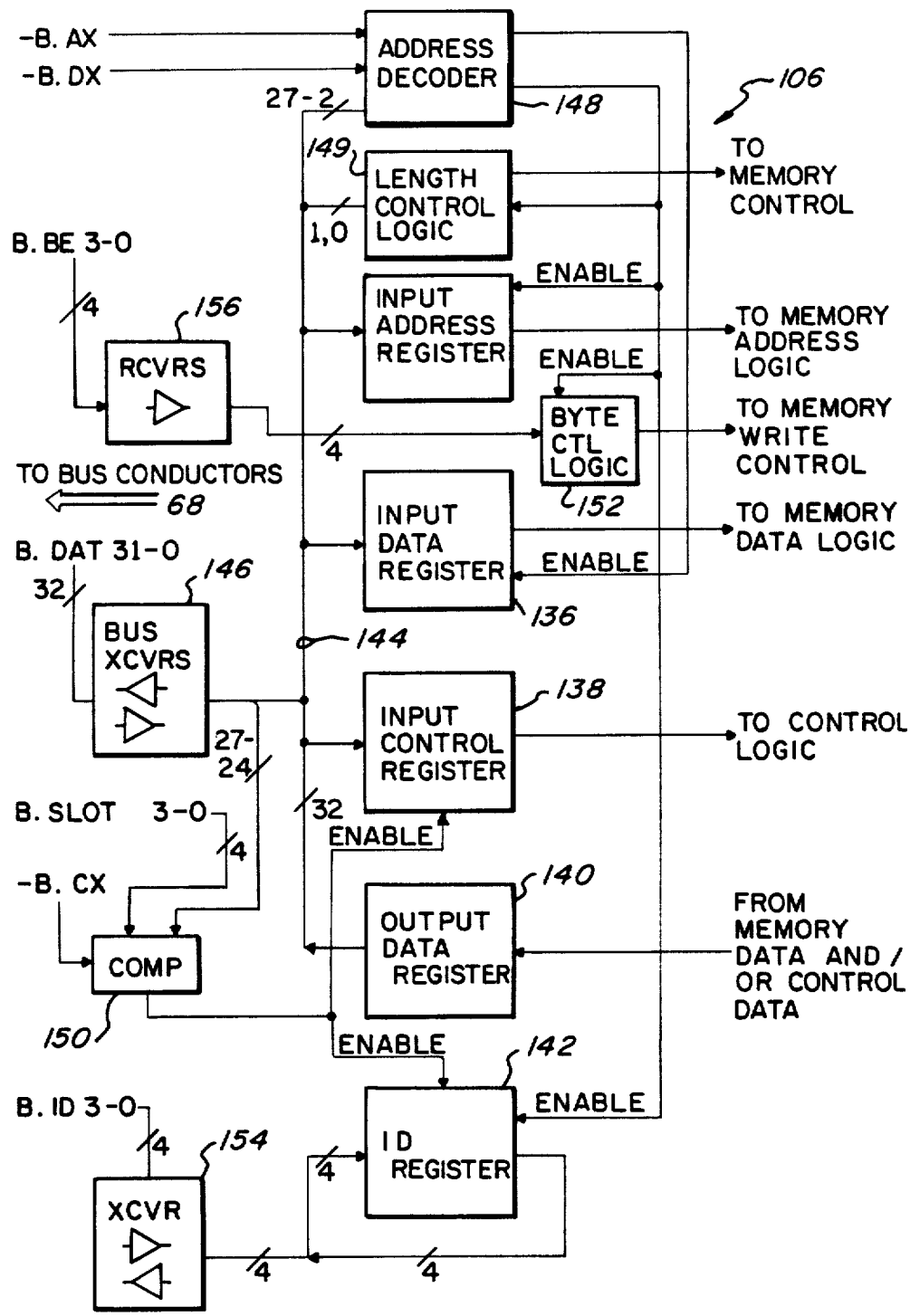
Fig_9

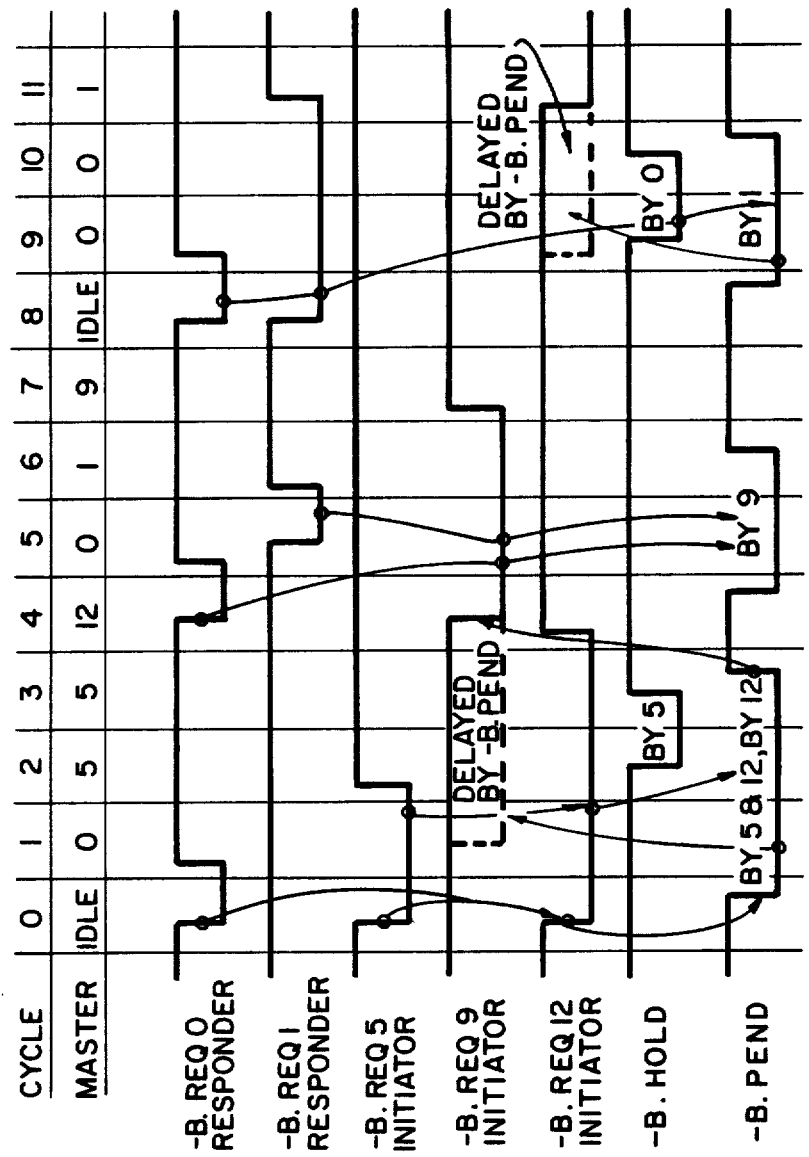
Fig_11

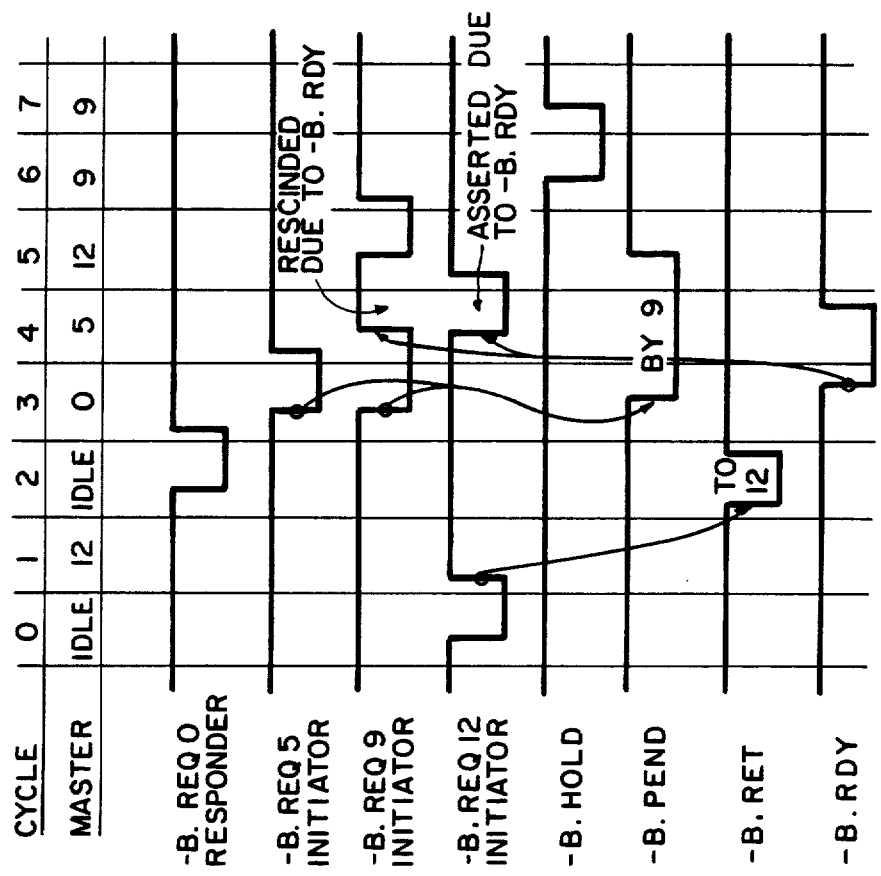
Fig_12

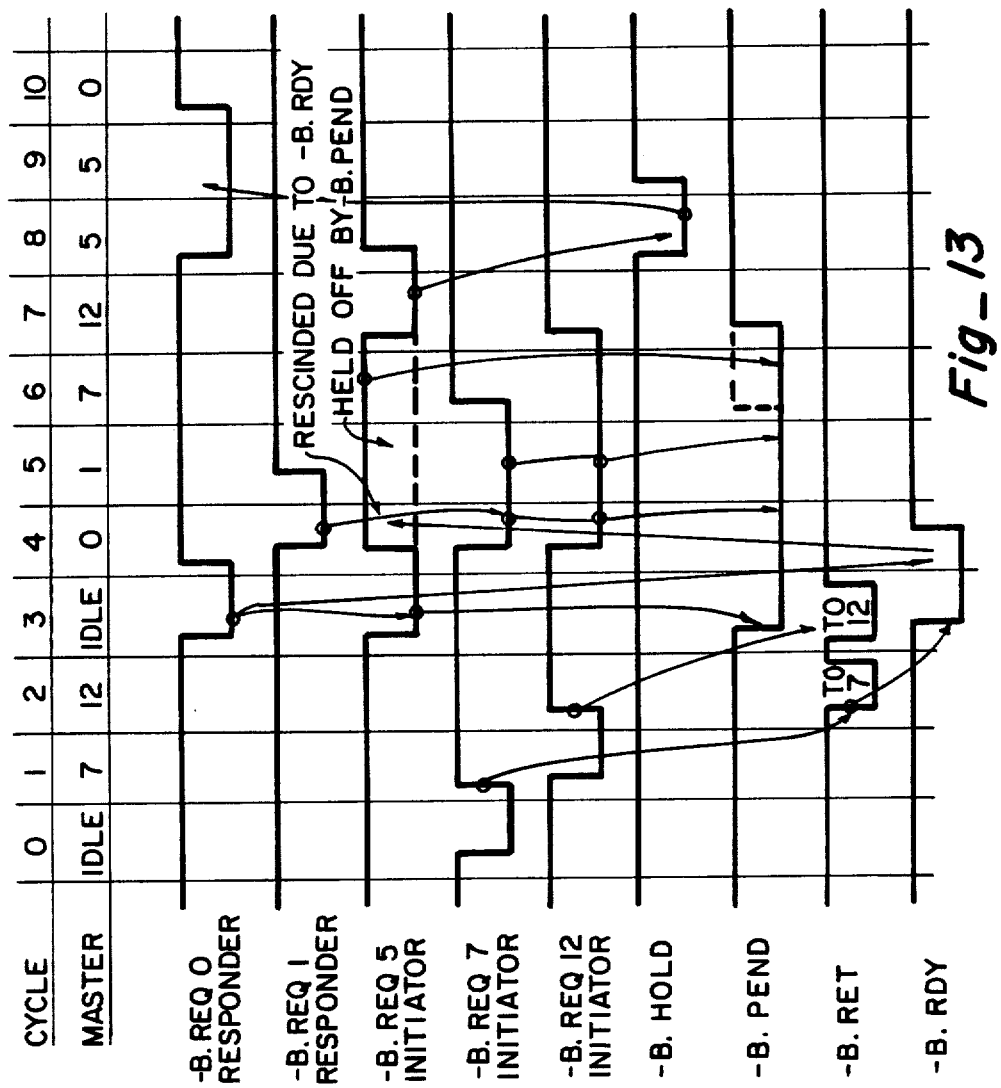
Fig_13

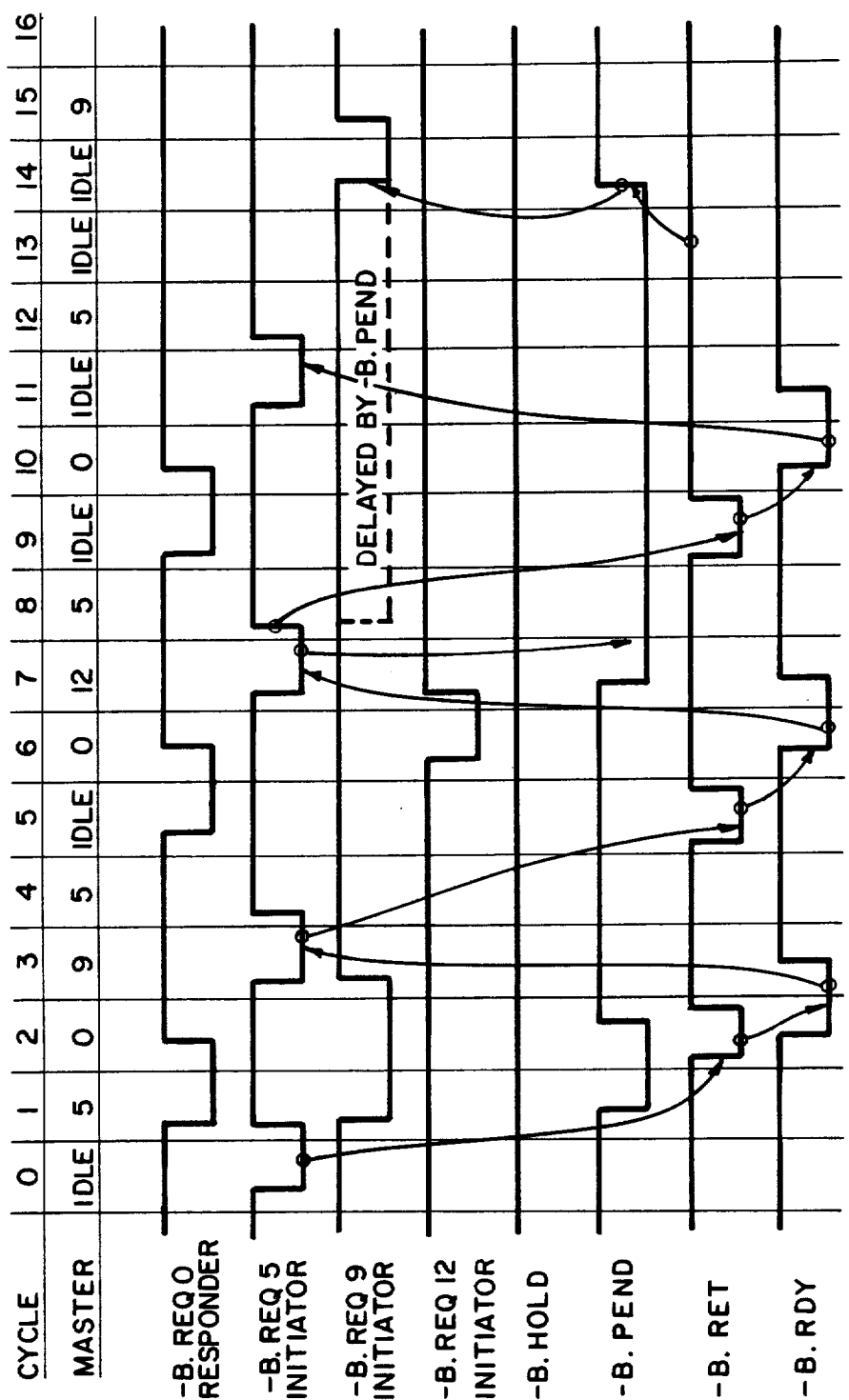
Fig_14

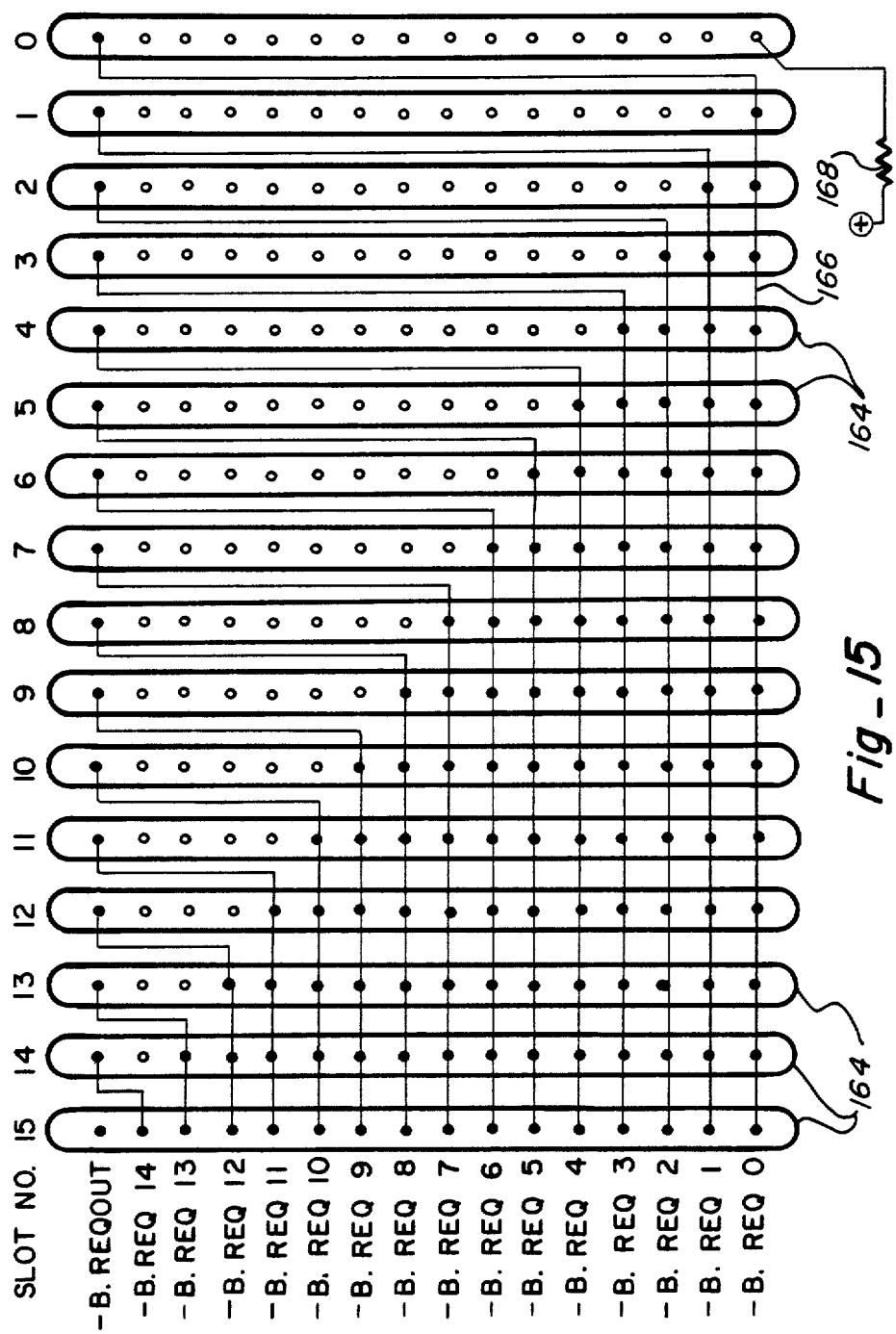
Fig_15

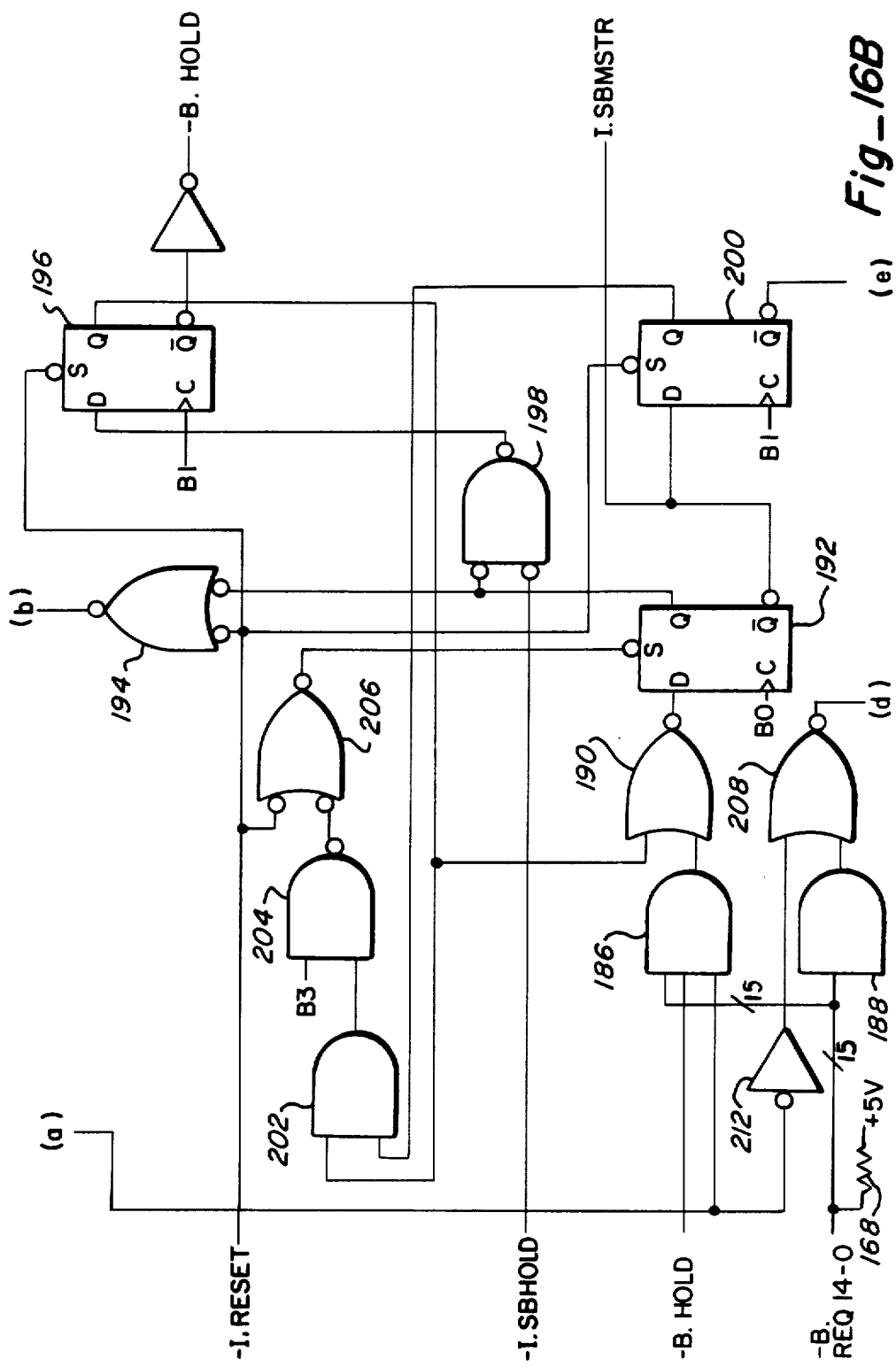
Fig_16B

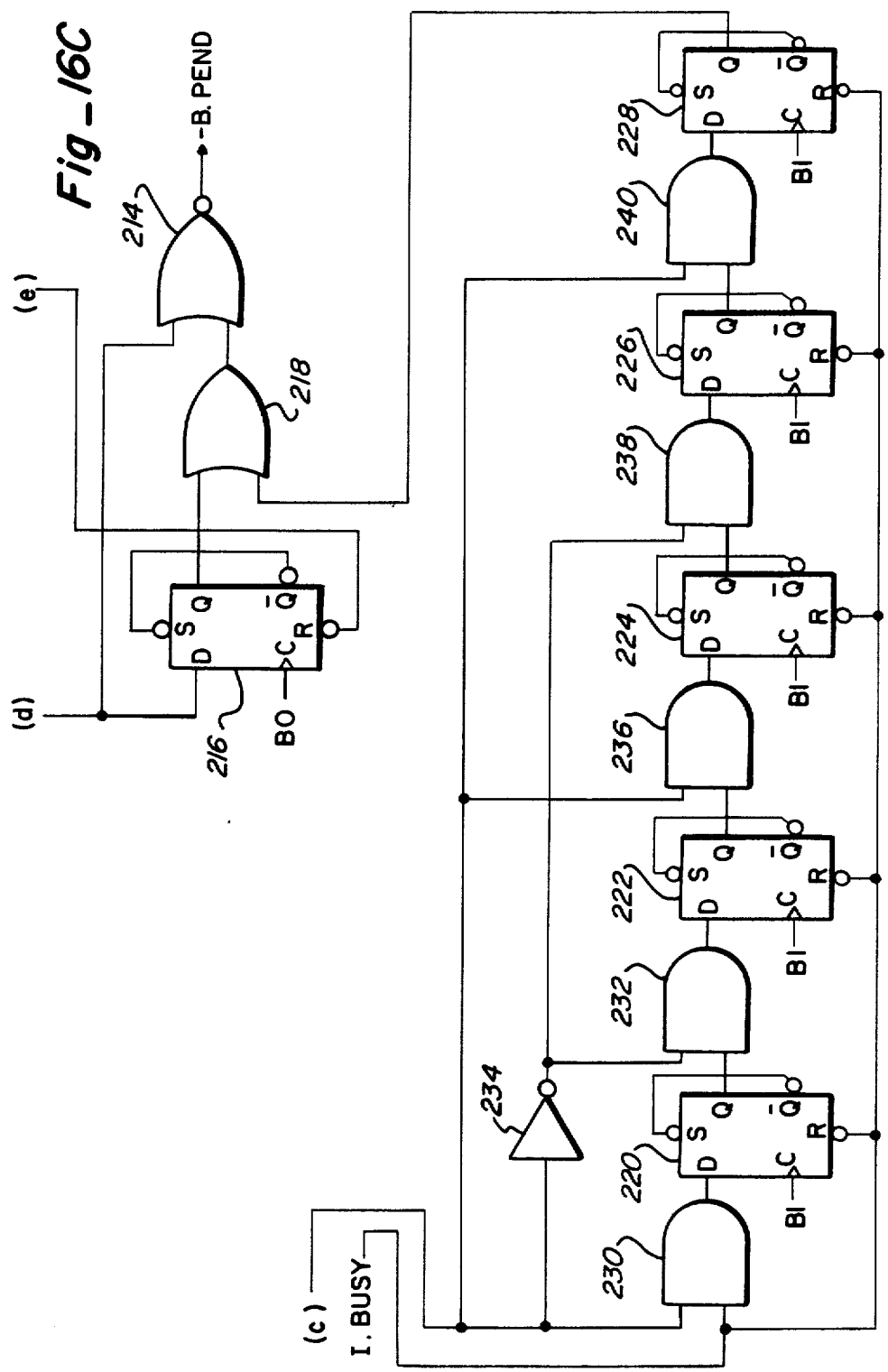
Fig_16C

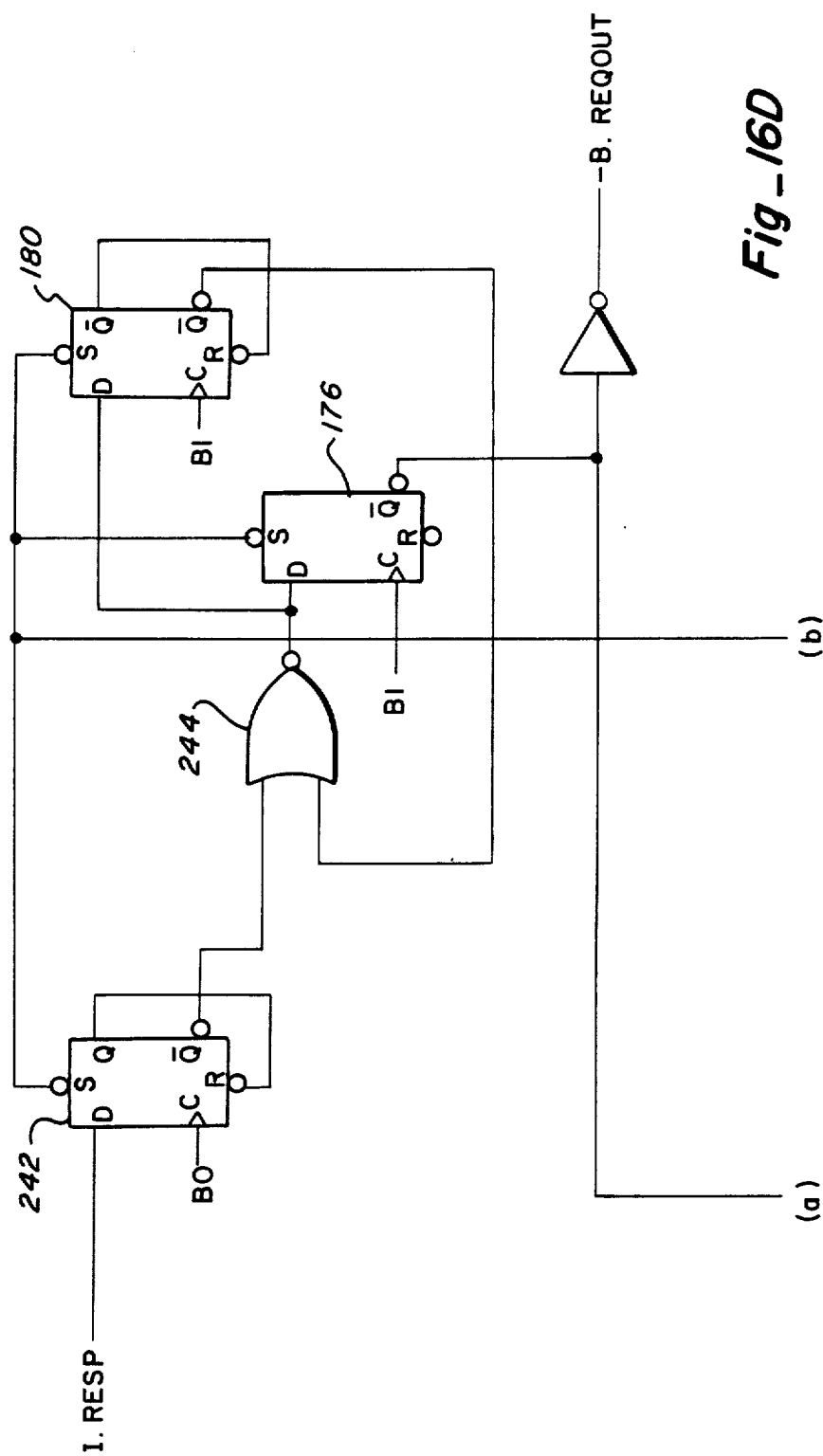
Fig_16D

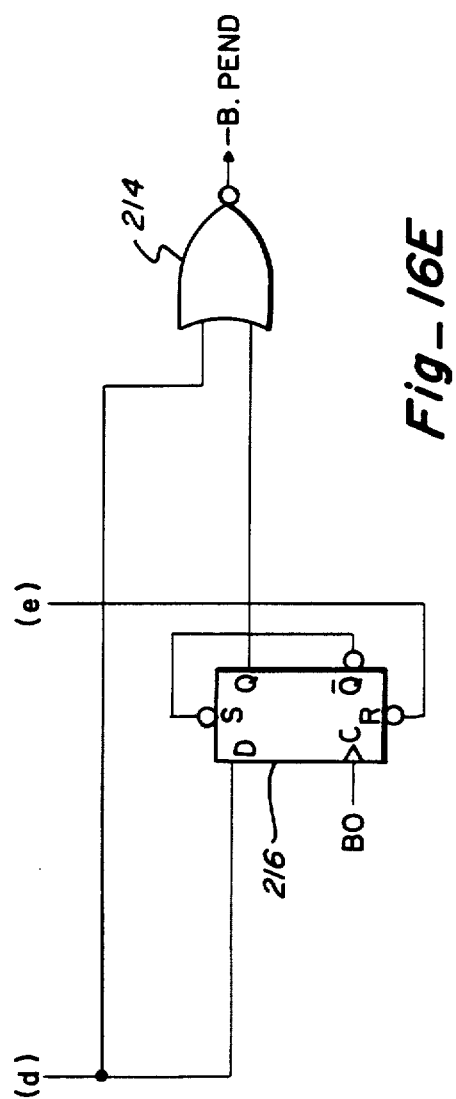
Fig_16E

FAIR ARBITRATION TECHNIQUE FOR A SPLIT TRANSACTION BUS IN A MULTIPROCESSOR COMPUTER SYSTEM

The present invention pertains to a new and improved synchronous, transaction arbitrated, split transaction bus for advantageous use in a tightly coupled multiprocessor computer system to attain data transfers of high aggregate throughput shared fairly among a plurality of initiators (e.g. processors) and responders (e.g. memories) as a result of an improved arbitration technique.

BRIEF BACKGROUND OF THE INVENTION

In a computer system, a bus is the means by which the electrical signals are communicated back and forth between a central processor, memory, and other devices such as input and output adapters. In a uniprocessor computer system, the bus may simply be a plurality of electrical conductors linking the various components of the system. However, in multiprocessor and other more sophisticated computer systems, the bus may become more complex and play an active role in directing the various signals between the components of the computer system, usually for the purpose of obtaining greater data throughput or speed of operation.

One of the significant restrictions in the operation of a modern high speed computer is the memory access time of main memory. The memory access time is that time required for the memory to retrieve the information from its internal storage after it has received a read address signal. Since a high percentage of data processing activities in a computer system involves reading information from memory, the cumulative amount of memory access time involved in typical data processing activities can be significant. The cumulative effect of the waiting during access time periods is to reduce the data throughput of the computer system. In a uniprocessor computer system, the system is inactive during the memory access time because the processor is waiting on a response from the memory during the memory access time. In a uniprocessor system, this is not particularly a problem because there is nothing else which the system could be doing during the access time period. However, in multiprocessor systems, the other processors in the system could use the access time periods to conduct other activities, and thereby increase the throughput of the system.

These problems have been recognized and, as a result, split transaction buses have been devised. In a split transaction bus, the bus is arranged to communicate a read address signal from the initiator (e.g. processor) to the responder (e.g. memory) in a separate transaction from that transaction which is delayed in time during which the addressed memory transfers or communicates the read data information from its internal memory back to the initiator. During the time period which elapses between the read address signal and the response from the memory, the other processors in the computer system are communicating other signals to other components of the system over the bus.

In order to avoid the confusion resulting from conflicting communications between the various components of the computer system, an arbitration technique is necessary in each split transaction bus. The arbitration technique determines which one of the particular components of the system has exclusive access to the bus at any particular time. The time intervals during which information can be communicated over the bus are known as bus cycles. In order to resolve competing requests to use the bus, each of the components of the system must be assigned a priority.

One typical approach to bus arbitration is known as activity arbitration, in which a higher priority system component is given exclusive access to the bus for a sufficient number of bus cycles or time in order to conclude any particular activity. The disadvantage of activity arbitrated buses is that the higher priority component may retain access to the bus for a sufficiently long time period and prevent other components from being able to transfer information, thereby losing that information.

Another type of arbitration technique is cycle arbitration, in which each and every cycle of the bus is individually arbitrated. The disadvantage of cycle arbitration is that an excessive amount of time is consumed in individually arbitrating each and every cycle, which can result in a reduced information throughput.

Cycle arbitration is particularly time consuming on systems utilizing centralized arbitration. In centralized arbitration systems, a single processor or other component resolves all competing requests for use of the bus and determines which of the individual components is given access to the bus. Centralized arbitration usually requires the competing system components to communicate request signals to the centralized arbiter, and the centralized arbiter to communicate the signals giving a particular component access to the bus after the arbitration has been determined. This process, known as "handshaking", also consumes time during which no usable information can be communicated over the bus. Such centralized arbitration techniques therefore also tend to reduce the capacity for data transfer, known as "bandwidth" of the bus.

Distributed arbitration techniques have been devised to avoid the problems associated with centralized arbitration. In a distributed arbitration system, each individual component of the computer system includes its own circuitry or logic to arbitrate the requests from all of the system components and determine which component is given exclusive access to the bus during a particular bus cycle. Distributed arbitration techniques usually involve less time consumptive activities on the bus itself and increase the capacity of the bus.

At the present time, synchronous buses also contribute to higher bus capacity. A synchronous bus is one in which all information transfers take place in synchronism with a single clock signal. An asynchronous bus is one in which the activities on the bus are not clocked at regular intervals. With a synchronous bus, there will generally be a higher information capacity because the clocked synchronism of all transfers of information operate on the assumption that the component receiving the information will have in fact received it. In contrast, an asynchronous bus requires that the component receiving the information send back a signal acknowledging its receipt. The separate acknowledgement signal also utilizes bus capacity without contributing to data throughput. So long as memory cycle times, that is the memory access time plus that additional minimum time required to respond to the next successive read address signal, are substantially greater than the bus cycle time, a higher data throughput will be obtained from synchronous buses than from asynchronous buses. Traditionally, synchronous buses have also been more reliable because the operation of the bus can be checked by sampling signals at given points in time and looking for inconsistencies in the sampled signal. Lastly, and perhaps most importantly, synchronous buses allow the implementation of sophisticated arbitration techniques. In an asynchronous bus, there is very little, if any, arbitration, since requests for use of the bus will be resolved on a basis of which request is received first in time. In synchronous buses, more sophisticated determinations can be implemented because requests are sampled at selected fixed points in time rather than aperiodically, and competing requests can be resolved on the basis of priority of importance assigned to the particular system component generating the request.

BRIEF SUMMARY OF THE INVENTION

In significant respects, the present invention relates to improvements in the arbitration technique employed in a synchronous, split transaction bus. The arbitration technique of the present invention assigns unique priority designations to each of the plurality of modules or components in the computer system. This assigned priority is used to resolve competing contentions or collisions between different modules requesting exclusive access or "mastership" of the bus. The arbitration technique also involves discrimination between "initiator" modules which initiate transactions over the bus, such as processors or input/output devices, and "responder" modules which respond to the initiators, such as memories.

In the arbitration technique of the present invention, responders are given priority over initiators, based on the premise that the delay times will be reduced and the data throughput will be increased by not delaying the responses to waiting initiators any longer than is necessary for the responders to supply the information which the initiators have previously requested. Both the initiators and the responders will become more active and incur less wait states as a result. Competitions for mastership between responders are resolved on the priority basis designated to each module. Such fixed priority arbitration between responders cannot result in one responder "monopolizing" the bus to the detriment of other responders because responders perform bus activity solely in response to previous bus activity by initiators.

The arbitration of competing requests by initiators imposes "fairness" to prevent faster, or higher priority, initiators from utilizing so much bus bandwidth that lower priority, or slower, initiators are unable to operate effectively. The arbitration fairness assigns bus mastership to competing initiators based on fixed priorities for requests arriving during a given bus cycle. All requests from initiators arriving during any given cycle are handled, in priority sequence, before any requests from initiators arriving during subsequent cycles.

Initiators which address busy responders, that is a responder which is involved in currently responding to a previous request from another initiator, are supplied with an indication when the responder is no longer busy. Until such indication is supplied, a re-try to that particular module is deferred until there is an opportunity that the particular module can accept the initiator's request. In order to expedite such re-try activities, requests from non-retrying initiators are temporarily rescinded when a responder indicates that it is ready to receive a re-try.

Transactions as opposed to transfers over the bus are arbitrated. Each transaction can consume up to a maximum predetermined number of bus cycles, and the maximum number of bus cycles is selected so that no particular module will monopolize the bus for such an excessive amount of time that other information might be lost from other modules. For transactions which require more than one bus cycle, a signal indicating that the bus is to be held for more than one consecutive cycle is delivered to defer arbitration until completion of the previous transaction. Each of the modules includes its own distributed arbiter for resolving the mastership of the bus.

A relatively high aggregate data throughput is obtained from the present invention as a result of eliminating the equal competition between initiators and responders for bus mastership. By giving the responders precedence over the initiators, the initiators become active sooner upon receiving the information previously requested from the responders. By signaling waiting initiators that a previously busy responder has become available and is no longer busy, and giving retrying initiators precedence over non-retrying initiators, bus bandwidth is not excessively wasted on useless retries, as is the case with arbitrarily initiated re-try requests common in some prior buses. Similarly, bus capacity is expanded and more evenly distributed among the modules, by deferring all subsequent requests until the previous requests have been serviced in priority order. By arbitrating on the basis of individual transactions, as opposed to activities or bus cycles, data throughput is also increased.

These factors and others contribute to the improvements available from the present invention. The present invention can be understood more completely by referring to the accompanying detailed description of a presently preferred embodiment of the invention, and the accompanying drawings. Of course, the scope of the invention itself is defined by the appended claims.

BRIEF DESCRIPTION OF THE DRAWINGS

FIG. 1 is a block diagram illustrating a computer system which incorporates a plurality of processor modules, a plurality of input/output adapter modules, a plurality of main memory modules, a plurality of special purpose memory modules, and the improved bus of the present invention.

FIG. 2 is a block diagram of the bus of the present invention shown in FIG. 1, illustrating certain significant signals conducted over the bus and portions of an initiator module and a responder module which are also shown in FIG. 1.

FIGS. 3A, 3B, 3C, 3D, 3E, 3F, 3G, 3H, 3I, 3J, 3K, 3L, 3M, and 3N are timing wave form diagrams illustrating bus cycles, components of bus cycles, and the timing of various signals on the bus which are illustrated in FIG. 2. FIG. 3G designates separate bus cycles and states of each bus cycle.

FIG. 4 is a logic circuit diagram of a clock receiver of each bus coupler of the bus shown in FIG. 2.

FIG. 5A is an illustration of a doubleword which may be transferred over the bus of the present invention as the basic unit of data transfer in a single transaction, and FIG. 5B illustrates four doublewords which are the maximum number of doublewords which may be transferred over the bus in a single transaction.

FIGS. 6A, 6B, 6C, 6D and 6E are illustrations of data write, data read, test and set and memory scrub, control write, and control read transactions, respectively, which may occur over the bus of the present invention, illustrated with reference to the number and spacial time relationship of various bus cycles during which transfers of these transactions occur.

FIG. 8 is a block diagram of an initiator data path logic element shown in FIG. 2.

FIG. 9 is a block diagram of a responder data path logic element shown in FIG. 2.

FIG. 11 is a timing diagram illustrating an example of multiple requests and the resolution thereof, among other things, under the arbitration technique of the present invention.

FIG. 12 is a timing diagram illustrating an example of a rescinded request, among other things, under the arbitration technique of the present invention.

FIG. 13 is a timing diagram illustrating an example of multiple re-trying initiators, among other things under the arbitration technique of the present invention.

FIG. 14 is a timing diagram illustrating an example of multiple re-trys by one initiator, among other things, under the arbitration technique of the present invention.

FIGS. 11 to 14 employ arrows connecting various signals to indicate conditions giving rise to causative events. The circles at the tails of the arrows represent the various conditions which create or cause the situation indicated at the head of the arrow.

FIG. 15 is a generalized representation of pin connectors for connecting each of the modules shown in FIG. 1 into a mother board or back plane of the bus, and further illustrating the means by which request signals from each module are connected to other modules.

FIGS. 16A, 16B and 16C, collectively, are a schematic diagram of the logic circuitry of the arbitration logic of an initiator of the bus as is shown in FIG. 2.

FIGS. 16D, 16B and 16E, collectively, are a schematic diagram of the logic circuitry of the arbitration logic of a responder of the bus as is shown in FIG. 2.

FIGS. 16A, 16B, 16C, 16D and 16E are idealized schematic representations of logic circuitry which differ in actual implementation only in the sense that certain additional components are required to achieve compensation for time and propagation delays when operated at very high speeds.

DETAILED DESCRIPTION

Figure 7A:
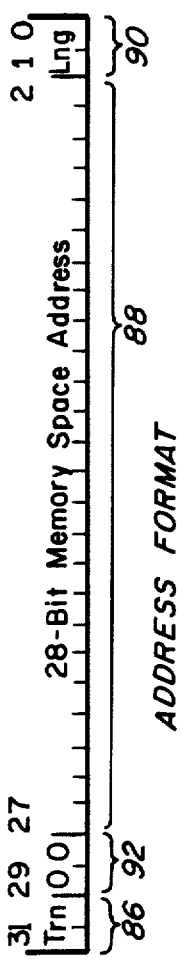
FIGS. 7A, 7B and 7C are illustrations of the bit formats of an address, a read and write data and a control doubleword which may be transferred over the bus of the present invention during the various transactions illustrated in FIG. 6.

A tightly-coupled multiprocessor computer system is illustrated in FIG. 1. The bus of the present invention, designated 50 in FIG. 1, serves as a high performance communication means for communicating data, control transfer, control status, and arbitration signals between a plurality of central processor modules 52, a plurality of input/output ("I/O") adapter modules 54, a plurality of main memory modules 56, and a plurality of special purpose memory modules 58. The bus 50 allows the plurality of processors 52 and I/O adapters 54 to communicate with each other and to share a common pool of main 56 and special purpose 58 memory. The computer system shown in FIG. 1 is tightly coupled because its plurality of central processor modules 52 communicate over the single bus 50 to a common pool of main memory.

Each of the memory modules 56 and 58 includes conventional memory components. The main memory module 56 is the general purpose memory of the system. The memory components of the special purpose memory module 58 may also be conventional, but they may be subject to modification from a source other than that shown in FIG. 1. For example, the special purpose memory modules may be graphics memory modules and an external drawing engine (not shown) may be employed to draw vectors, characters and other symbols into the graphics memory through a communication path other than over the bus 50. Some or all of the memories in the modules 56 and 58 may be cache memories, and cache memories may be included in the processor and I/O adapter modules 52 and 54. Of course, the overall purpose of each of the memories is to retain data which has been written or recorded into the memories at predetermined addresses, and to supply the information recorded at particular addresses back to some other component or module which has requested the information at the particular address.

Each central processor module 52 includes a conventional processor which manipulates data in the memory. The processors may also interpret the contents of memory as specific instructions, data, etc., in order to process data.

Each I/O adapter module 54 is connected to an I/O device (not shown). Each I/O device may be one of a variety of different external devices connected to the computer system. For example, the I/O devices may be a local area network, another computer such as a small or personal computer, and a disk memory. Each I/O adapter 54 presents a uniform electrical interface to the bus 50 in order that communication is established between the I/O devices through the I/O adapter modules 54 to hhe other modules connected to the bus 50.

Each of the modules 52, 54, 56 and 58 include a coupler by which signals from the bus are communicated to the other components of the module, and communications originating from the other components of the module are coupled back to the bus through the coupler. The couplers are described in greater detail in FIG. 2 and are part of the bus 50 as described herein.

The modules attached to the bus 50 are either "initiators" or "responders". An initiator module and a responder module are each a particular type of module whose characteristics are established and are incapable of changing.

An initiator module is one which is capable of initiating bus activity for the purpose of performing transfers in response to exogenous or internally generated conditions. The central processor modules 52 and the I/O adapter modules 54 are initiators and are referenced as such at 60. The processor in each central processor module 52 initiates bus activity from internally generated conditions, such as those occurring in response to the execution of instructions. The I/O adapter modules 54 initiate bus activity in response to exogenous events such as signals supplied from the I/O devices.

Responder modules are those which are only capable of initiating bus activity for the purpose of performing transfers in response to requests issued by initiators. That is, a responder is capable of initiating bus activity in response to a previously received bus activity, and not in response to exogenous events. Thus, the memory modules 56 and 58 are shown as responders at 62 because they only respond to previous requests by the initiator modules 52 and 54.

The responders are interfaced to the bus 50 on a split transactional basis. The responders receive a read request signal at one bus cycle or point in time, and at a later bus cycle or later point in time greater than or equal to the memory access time and in conjunction with a specific bus cycle, send the reply back to the initiator.

Because the modules both transmit signals over the bus 50 and receive signals over the bus 50, all of the modules can function as a "master" at a particular time and as a "slave" at a different time. At any given time, the bus 50 is either idle (null), meaning that no "transfer" or activity is going on over it; or the bus is active, meaning that exactly one "transfer" or activity is going on over it. During each active bus cycle, one module functions as a master and one module functions as a slave. The module functioning as a master is that module which is driving the transfer and transfer control signals, and the module functioning as the slave is that module which is selected to receive the transfer and transfer control signals driven by the master. The terms "master" and "slave" are therefore dynamic concepts related to bus arbitration and usage. For example, when a processor module 52 is sending a read request to a memory module 56, the processor module 52 is the master and the memory module 56 is the slave. However, when the memory module 56 is replying to a read request sent previously by the processor 52, the memory module 56 is the master and the processor that requested the information is the slave.

With reference to FIG. 1, unlike many computer systems, there is no physical dedicated connection between the I/O adapters and the processors. The single shared bus 50 is the sole means of intercommunication between all modules of the computer system. The communication between the software running on the processor module 52 and an I/O adapter module 54 which will physically perform the input/output to an I/O device is through shared data structures stored in the main memory on the memory modules 56. These data structures are used in establishing a uniform communication protocol between all of the modules connected to the bus 50. One such communication protocol is described in the application for an "Input/Output Control Technique", Ser. No. 910,006, filed concurrently herewith and assigned to the assignee hereof.

More details of the bus 50 are illustrated in FIG. 2. The bus 50 includes an initiator coupler 64 connected to each initiator module 60 and a responder coupler 66 connected to each responder module 62. The initiator coupler 64 and the responder coupler 66 are very similar. Each significant difference will be described below. Signals between the bus couplers 64 and 66 of each of the modules are conducted over a plurality of electrical conductors, indicated collectively at 68. For ease of illustration, pluralities of conductors are indicated by single lines in FIG. 2. The bus coupler 64 serves as means for coupling the bus signals to the remaining components of circuitry on each module 60 or 62, and for transmitting the signals from the components of circuitry on each module 60 or 62 to the bus conductors 68. The bus conductors 68 are physically located on a back plane 70 or "mother" circuit board. The couplers 64 and 66 are connected to the back plane 70 through a conventional multipin connector (not shown), and all signals between the couplers 64 and 66 and the bus conductors 68 pass through such connectors.

The groups of signals conducted over the bus conductors 68 of the bus 50, which are germane to the present invention, are designated as initialization signals, clock signals, arbitration signals, information transfer signals, transfer control signals, transfer status signals, and a ready signal, shown in FIG. 2. A convention employed throughout this description is that signals present on the bus 50 are capitalized and begin with "B" followed by a ".". A prefix of "-" is used on bus signal names which are active when the signal is asserted in a logically low state. The lack of a prefix indicates that the signal is asserted in a logically high state.

Each bus coupler 64 and 66 includes an initialization circuit 22, which receives the initialization signals. Each initialization circuit 22 responds to the initialization signals to create predetermined initial conditions in the bus coupler 64 and 66 and to reset or otherwise override normal operation of the bus and the attached modules. The initialization signals include a signal to place the system into a known state when the computer system is initially powered up, a signal to place the computer system into a known possibly different state in recovery from catastrophic errors, and an error signal which is used to deal with the occurrence of an uncorrectable error condition. Such initialization signals and the initialization circuitry 22 which responds to those signals are conventional in computer systems and are therefore not described further.

The bus 50 also includes a centralized clock generator 74 attached to the back plane 70 separately from the modules. The clock generator 74 supplies clock signals over clock signal conductors of the group of bus conductor 68 to clock receivers 76 located in each bus coupler 64 or 66. The clock signals are those signals which create the fundamental synchronization for all transfers and other activity over the bus. These clock signals also define each bus cycle and a plurality of bus states during each bus cycle. Because the synchronization is fundamental to the proper operation of the bus, and because the bus operation proceeds at a relatively high rate, equal length conductors extend between the clock generator 74 and the clock receivers 76, and separate clock drivers for the signals at each bus coupler 64 and 66 are employed to avoid or minimize clock skew. By minimizing clock skew, synchronization is more closely retained.

The clock generator 74 is a conventional generator which supplies the B.CLK1 and B.CLK0 signals, shown in FIGS. 3A and 3B, respectively. The B.CLK1 and B.CLK0 signals are a pair of square waves in quadrature. Because the clock signals are used to synchronize all transfers over the bus, it is important from a practical point of view to make sure that the clock signals arrive at all modules at the same time. If the clock signals arrive at a different time, this resultant difference is known as clock skew. Clock skew, if aggravated enough, could cause one module to sample data at a point in time when another module had not yet put the data on the bus conductors, for example. Clock skew can reduce data communication reliability. The approach employed in the present invention is to distribute separate copies of the B.CLK1 and B.CLK0 clock signals to each module and to make the bus conductor over which the clock signals are applied equal in length from the clock generator 74 to a clock receiver 76 in each module. A a result, the clock skew resulting from differential signal propagation speed and the clock skew resulting from differential loading on the signals is minimized.

Each clock receiver 76 is schematically illustrated in FIG. 4 and includes four exclusive-OR (XOR) gates, 78, 80, 82 and 84. The four XOR gates are physically contained within a single integrated circuit (IC) package such as a common "74F86" component. By combining all four XOR gates in a single IC, all four gates are subject to the same temperature and the same voltage so that differential signal delay and propagation through each of the gates will be minimized. One of the input terminals to each XOR gate 78 and 80 is grounded, and one of the input terminals to each XOR gate 82 and 84 is held at a logically high level. The B.CLK1 signal is applied to the other input terminal of XOR gates 78 and 82, the B.CLK0 signal is applied to the other input terminal of EXOR gates 80 and 84. Bus cycle state signals B0, B1, B2 and B3 are created by the four XOR gates 78, 80, 82 and 84 in response to the application of the B.CLK1 and B.CLK0 signals. The B0, B1, B2 and B3 state signals are illustrated in FIGS. 3C, 3D, 3E and 3F respectively.

Each bus cycle spans the time period between the leading edge of the B0 signals, and each bus cycle is illustrated in FIG. 3G by a "T" with a subscript indicating successive cycles. Four bus states exist within each bus cycle, and each bus state exists beginning at time that the B0, B1, B2 and B3 signals transit from the low logic level to the high logic level, and continue until the next bus state signal is asserted. These four bus states are also illustrated in FIG. 3G. Events which are described as occurring at or during a given bus state commence on the clock edge at the beginning of that state. Only the rising edges of signals B0, B1, B2 and B3 are used by the bus coupler logic.

The use of the four XOR gates in each clock receiver 76 results in gray code clocking for each of the B0, B1, B2 and B3 bus state signals to eliminate the possibility of state decoding errors. Four distinct bus states are obtained while the maximum frequency transmitted through the clock bus conductors 68 is reduced. In the preferred embodiment of the present invention, bus cycles occur at 10 MHz, each bus cycle spans approximately 100 nsec, and each bus state exists for approximately 25 nsec. The four bus state signals are supplied to other elements within the bus couplers 64 and 66 as is shown in FIG. 2.

The B.DAT31-0 signals shown in FIG. 2 transfer information between the bus couplers 64 and 66. The basic unit of information transfer is a 32 bit entity which is called a "doubleword" and is shown in FIG. 5A. The doubleword consists of four bytes illustrated with byte numbering shown. The doubleword is also two words with the ordering as is illustrated. During each active bus cycle, one doubleword is transferred. In a single transaction, either one, two, or four doublewords may be transferred. Four doublewords are illustrated in FIG. 5B. A "transaction" as used herein is an activity which performs the higher level function of transferring over the bus, one, two, or four doublewords or a comparable entity and which consumes one or more consecutive bus cycles. For those transactions which require more than one sequential bus cycle, bus mastership or exclusivity is maintained in the master module which is involved in transferring the multiple doublewords during a single transaction.

The basic types of transactions that are supported by the bus of the present invention are illustrated in FIGS. 6A, 6B, 6C, 6D and 6E. Each of these transactions have the different timing patterns with respect to the bus cycles as shown.

A data write transaction is illustrated in FIG. 6A. A data write transaction consumes from two to five consecutive bus cycles. All data write transactions consume the bus cycles X and X+1, wherein the address of the memory location to which the data is to be written is transferred during bus cycle X from the initiator to the responder, and during the bus cycle X+1 the initiator supplies the single data doubleword to be written to the responder. The bus cycle X+2 is consumed if the transaction involves the transfer of two data doublewords. The bus cycles X+3 and X+4 are consumed if the transaction involves the transfer of four data doublewords. A side effect of the minimum length of a data write transaction being two bus cycles is that the cache coherence logic of any cache memories in the system are guaranteed to have sufficient time to operate on the address transferred during cycle X, since no other address can appear on the bus during cycle X+1. In the case of multiple data doubleword transfers in data write transactions, the second, third and fourth doublewords are written into sequentially ascending doubleword address locations of memory, beginning with the one address value sent during the bus cycle X of the transaction.

A data read transaction is illustrated in FIG. 6B. During the first cycle of the data read transaction, indicated by bus cycle X in FIG. 6B, the initiator transfers the address to be read to the responder. At some time later, which is always an integral number of bus cycles and which is always greater than or equal to the read access time of the memory, the responder commences supplying the information from the addressed memory address location at cycle Y. The amount of time between cycles X and Y may be related to bus arbitration delays, but it is always greater than or equal to the read access time. During this time period between cycles X and Y, the bus is available to communicate signals between other modules of the computer system to obtain a higher data throughput. In a non-split transaction bus, the bus would remain idle through the time period between cycles X and Y and no data would be communicated during that time period. The bus cycle Y+1 will also be consumed if the read request delivered during bus cycle X was for two doublewords. Similarly, bus cycles Y+2 and Y+3 will also be consumed in consecutive order if the read request was for four doublewords.

FIG. 6C illustrates a test and set and memory scrub transaction. The test and set and memory scrub transactions are implemented by bus function in the present invention as opposed to other activities which would otherwise require more overhead or penalty in processing time in interference between processors or in information transfer over the bus. The transaction shown in FIG. 6C requires three bus cycles, with a time separation between the second and third cycles. The first cycle X is a transfer of an address from an initiator to a responder. In the bus cycle X+1 immediately following the address transfer during a test and set and/or a memory scrub transaction, the bus will be null or idle and have no activity of any kind. The null activity on the bus during cycle X+1 is to permit cache coherence logic of any cache memories in the system to have sufficient time to operate on the address transferred in cycle X. The last bus cycle Y, is separated in time by an integral number of bus cycles and not less than the memory access time from the first two bus cycles X and X+1. During the last bus cycle Y, a single doubleword is sent from the responder to the initiator at the address designated in cycle X.

The presence of a separate, discrete test and set operation as a bus primitive as opposed to a processor primitive is an improvement of the present invention. In a multiprocessor computer system, and especially in a tightly coupled multiprocessor system, there needs to be some means of mutual exclusion to certain structures or resources in memory. One of the processors or initiators must gain exclusive access to the structure or location of memory so that the structure cannot be modified by any other initiator.

The most common means by which mutual exclusion is accomplished is a software structure referred to as a "semaphore" or a "spin lock" and in hardware is generally referred to as a "test and set" operation. In these operations the processor seeking exclusive access reads a memory location to test its value and writes a known fixed value into that memory location in a manner that the read for testing and the write for setting are indivisible. Thus, the value of this memory location is set or "locked" to a fixed value in a guaranteed, enforced sequence. If in the process of testing the memory location, the contents read back to the initiator indicate that the memory location has previously been set, this resource is exclusive to some other initiator. If the data read back is any value other than the set value, it is exclusively for use by the initiator because the value has not previously been set to the locked value.

The conventional means of implementing a test and set is as a read-modify-write activity by the processor where the data is read from the memory location into the processor, tested and then written back. Virtually every microprocessor has a signal called lock or interlock or something similar by which to lock up the bus for exclusive access so no other initiator can interfere with the test and set operation. This is a classical need, and all known implementations of test and set has done it in this manner.

The problem with conventional test and set primitives in multiprocessor computer systems is the time required. It takes time to do the access to read, time for the test, and time to do the write in order to the accomplish the set. A considerable time, for example several microseconds, is taken up when the bus cannot be used by other initiators even though the usage would probably be non-conflicting. In the present invention, a special test and set transaction is applied to the bus which tells the memory to do the setting and to report the test as if it was a read. So the test and set transaction of the present invention is treated as a read, i.e., send out an address and get back the data just like it was a read and the data sent back is the original contents of the memory location which is being tested and set. The test and set transaction causes the memory module to write all ones into the memory location to thereby set or lock the location. Because this does not take up excessive bus cycles, null time on the bus is reduced to at least one cycle, X+1 shown in FIG. 6C, and higher data throughput have been gained. In addition, it is not necessary to provide separate conductors for routing the lock signals from the processors to the memories.

The test and set functionality has been essentially removed from being the responsibility of the processor to request exclusive access to the bus and memory for reading something, testing it and writing it. Instead, in accordance with the present invention a processor never has exclusive access to any module. The bus is never exclusively locked. The processor sends over the bus a test and set signal, which causes the memory to test the location, set it and send the test results back, and while this is going on all other initiators and responders are free to do other data transfers.

Memory scrub is another matter which can be an efficiency issue in a multiprocessor computer system. The reason for memory scrubbing is that dynamic semiconductor memory cells are subject to what is called soft errors. Soft errors primarily result when alpha particles impact storage sites in the memory array and corrupt the bits stored therein. This is a known attribute of semiconductor memories. The typical method to counteract this is to utilize error correcting codes in the memory. If a bit has been corrupted in a word, or a doubleword, the error correcting code can be employed to correct it. The cost effectiveness of error correcting codes permit the correction of only a single bit error in the word or doubleword. The rate at which these soft errors occur is relatively low, although as memories start going bad the rates significantly increase. The possibility that after one error occurs another one will occur in the same word or doubleword which cannot be corrected through error correcting codes, increases with time. As a result, memory scrubbing was developed.

Memory scrubbing involves periodically reading the data from memory and writing it back. In the process of reading it, single bit errors will be corrected, and the corrected data is written back. The fact that these are soft errors means the storage cell in the memory was not damaged by the alpha impact, just the data in it was corrupted. This is done periodically, for example once a week, as a means of scrubbing or eliminating the error.

Error scrubbing in a uniprocessor computer system is straightforward and easily implemented, but in a multiprocessor computer system error scrubbing can create a more complex problem. As an example, assume processor "A" is executing the scrubbing routine, reading and writing memory locations one after another. Further assume that processor "B" has exclusive access to one of these memory locations through normal software protocols and reads the location with the intent to modify its contents and write it back. Between the time processor "B" reads the memory location and the time processor ♭B? writes the modified contents back, processor ♭A? reads the memory location. Then processor "B" writes it and now the scrubbing routine on processor "A" writes it. The scrubbing routine has now eliminated the modified value written by processor B, thus totally corrupting the data in the memory location. To allow the scrubbing routine to know all of the global data structures and interlocks of the operating system is a prohibitively complex task, since it would have to be aware of what all of the other processors were doing all the time. Alternatively, the scrubbing routine would have to run only when nothing else was going on the system.

To avoid these problems, a memory scrub operation has been implemented in an analogous manner to test and set. A memory scrub signal is sent to the memory location, and the memory interprets the memory scrub signal to read the memory location and send its contents back to the processors just like a normal read, and in the process, also write the error corrected data back into the memory. So, by implementing test and set as a bus primitive, memory scrub was also obtained without additional complexity and the task of doing memory scrubbing in a multiprocessor computer system is simplified.

A control write transaction is illustrated in FIG. 6D. A control write transaction is a single bus cycle transaction which transfers control information from an initiator to another designated module, which may be either another initiator or a responder. The fact that control write transactions can be addressed to both initiator and responder modules is indicated by the use of the M indicating the address of the module to which the initiator addresses the control write transaction as shown in FIG. 6D. The control information within the control write transaction is of the nature of supervisory information between modules as opposed to data information or address information. The destination to which the control write transactions are addressed is determined by the location (or "slot") number assigned to each particular module, as determined by the physical connection of the module to the back plane of the bus.

A control read transaction is illustrated in FIG. 6E. A control read transaction is somewhat analogous to a data read transaction, in that there is a request and a reply separated by an integral number of bus cycles. In bus cycle X the control read is sent from an initiator to a responder. Only responders recognize control reads. At some later time designated as bus cycle Y, which is an integral number of bus cycles separated in time from bus cycle X, reply data is sent by the responder back to the initiator. Depending upon the type of control operation being accomplished, the control response time which separates bus cycles X and Y may or may not be related to a specific memory access time.

Figure 7B:
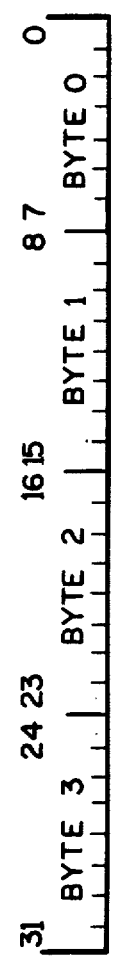
Figure 7C:
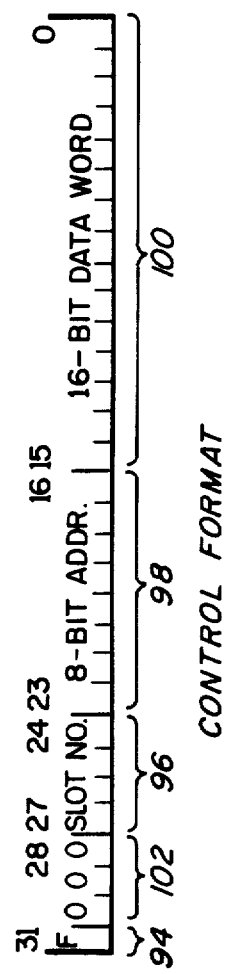

The contents or format of each doubleword transfer during each of the bus cycles involved in each of the transactions shown in FIGS. 6A, 6B, 6C, 6D and 6E, is illustrated in FIGS. 7A, 7B and 7C. There are three basic types of doubleword formats: the address format illustrated in FIG. 7A, the data format illustrated in FIG. 7B, and the control format illustrated in FIG. 7C. Each of these formats is 32 bits in length, and each of the formats has a number of relevant fields. The bit level signals in each of the fields are decoded by the appropriate logic in the bus couplers 64 and 66 under assertion of the appropriate transfer control signal (FIG. 2) to achieve the functions described.

The address format shown in FIG. 7A is the format for communication of address information and other control information from the initiator to the responder on the first cycle of data read, data write, test and set, and memory scrub transactions. There are three relevant fields within the address format doubleword. The first field referenced at 86 is a two bit field which indicates whether the doubleword is a read transaction, a test and set or scrub transaction, or a write transaction, as is determined by decoding these two higher order bits in the field 86. A second field 88 consists of a 28 bit address indicating the location in the memory space of the responder which is to be the subject of the transaction identified by the signals in the field 86. The memory space address field 88 extends from bit number 2 to bit number 27. The memory space address in field 88 is a doubleword address, and not a byte address. As a consequence the memory space address may begin in bit number 2 of the doubleword. A third field referenced 90 indicates whether the amount of data referenced by the address in the field 88 is one doubleword (00), two doublewords (01), or four doublewords (10) at the specified address. A fourth field 92 consists of bit numbers 28 and 29, which are not used.

The bus of the present invention supports aligned operation, which means that addresses in memory are accessed as doublewords and those doublewords have addresses which fall on modulo 4 byte boundaries. As a consequence, a modulo 4 adjustment with a 2 bit shift is present in the format shown in FIG. 7A. Such addressing arrangements are usually more efficient from the data throughput standpoint than those types of memory access arrangements which deal with unaligned data. When data reads and writes are being performed, all of the memory or responder modules of the computer system decode the information contained within the memory space address field 88. If the decoded address falls within the range of addresses attributed to one particular memory module, that one memory module becomes the slave for that particular transfer.

The address format doubleword shown in FIG. 7A is the format of the doubleword which is transferred in bus cycles X in the data write transaction shown in FIG. 6A, in bus cycle X in the data read transaction shown in FIG. 6B, and in bus cycle X in the test and set and memory scrub transaction shown in FIG. 6C.

The read and write data format shown in FIG. 7B constitutes an aligned doubleword of four bytes of data. Byte 0 is the least significant byte and is located in bit location 0 through 7. The other three bytes have significance as is illustrated in FIG. 7B.

The read and write data format shown in FIG. 7B is the format for each doubleword transferred in bus cycles X+1, X+2, X+3 and X+4 in the data write transaction shown in FIG. 6A; is the data format for each doubleword transfer during bus cycles Y, Y+1, Y+2 and Y+3 in the data read transaction shown in FIG. 6B; is the doubleword format transferred during cycle Y in the test and set and memory scrub transactions illustrated in FIG. 6C; and is the doubleword format transferred during the cycle Y in the control read transaction illustrated in FIG. 6E. Thus, the data format shown in FIG. 7B is that used for write data transactions, read data transactions and control read data transactions.

The format for control doublewords is shown in FIG. 7C. The control format doubleword is decoded for control write transactions and for the request portion of control read transactions. There are five fields in the control format doubleword shown in FIG. 7C. A single bit at bit location 31 forms a field 94 to indicate whether the doubleword is a read (1) or a write (0) transaction. A four bit field 96 from bits 27 through 24 identifies a physical slot to which the control doubleword is being directed. This particular physical slot is the connector on the back plane to which the particular module of the computer system is connected, and also identifies a particular module. The slave of a control transaction is selected by decoding the information in the slot field 96 and matching it against the physical slot number into which each particular module is connected. An address field 98 is located at bytes 16 through 27 and designates one of 256 possible control addresses within the module. Accordingly, up to 256 different control registers may be employed on each particular module. A field 100 at the low order 16 bits of the doubleword constitutes a 16 bit data word which is communicated from the master to the slave on all control transfer doublewords. In the case of a control write the 16 bit data word at the field 100 is what is written. Another field 102 is located at bits 28 to 30 and is unused.

The presence of the 16 bit data field 100 and the 8 bit address field 96 allows both the data to be written and the address of the location for the data written to be transferred in a single control doubleword transaction. This particular format and arrangement has utility in that it can be employed to access the page frame tables of a memory module in which the page frame tables are much longer than 256 locations. In the case of the control doubleword format shown in FIG. 7C, the field at 98 is not sufficiently large to uniquely identify which location of the page frame table which is being read. What is done is that one 8 bit address is assigned in field 98 for indicating page frame table access, and the actual page frame table address is assigned to the data word field 100. Thus, some write data information is being transmitted in the read request in this arrangement.

The control doubleword format shown in FIG. 7C is transferred during the control write transaction shown in FIG. 6D and during the bus cycle X of the control read transaction shown in FIG. 6E.

The bus 50, as is shown in FIG. 2, includes a data path logic element 104 in each bus coupler 64 of the initiator module 60, and a responder data path logic element 106 in each bus coupler 66 of a responder module 62. A group of information transfer signals are conducted over the bus conductors 68 between the data path logic elements 104 and 106 of the couplers 64 and 66. The information transfer signals communicate addresses, data, byte control information, and module identification information between the couplers. The usage and interpretation of the information transfer signals is determined by the state of the transfer control signals which are conducted over the bus conductors 68 between transfer control logic elements 108 and 109 of the bus coupler 64 and 66, respectively.

Included within the information transfer group of signals is a group of data transfer signals designated as B.DAT31-0. This group of signals is the 32 bit parallel data transfer signals illustrated in FIGS. 7A, 7B and 7C which carry address, data or control information from the master to the slave. These signals are conducted over the bus by 32 conductors of the group of bus conductors 68. The information transfer signals are asserted during the B0 state of a bus cycle and are negated during the B3 state of the same bus cycle. The assertion and negation of the B.DAT31-0 signals are illustrated in FIG. 3H relative to bus cycle TO.

A group of byte enable signals designated B.BE3-0 are also included within the group of information transfer signals. The byte enable signals carry information identifying the relevant bytes of data transferred in the group of signals B.DAT31-0. The byte enable signals are only meaningful during memory space address transfers as established by the appropriate transfer control signals, and are used only by memory modules for write and for test and set and memory scrub transactions. During these types of transfers bytes of the address memory doubleword are only modified if the corresponding byte enable signals is asserted. The byte enable signal for the byte at B.DAT31-24 (see FIG. 7B) is transmitted on the conductor which conducts the B.BE3 signal, the byte enable signal for the byte at B.DAT23-16 is transmitted on a conductor which conducts the B.BE2 signal, the byte enable signal for the byte at B.DAT15-8 is transmitted on the conductor which conducts the B.BE1 signal, and the byte enable signal for the byte at B.DAT7-0 is conducted on the conductor which conducts the B.BE0 signal. Accordingly, the B.BE3-0 signals are conducted over four parallel conductors included within the group of bus conductors 68. The byte enable signals are asserted and negated with the same general timing as the other information transfer signals as is shown in FIG. 3H.

Initiator module identification signals designated B.ID3-0 are also a part of the information transfer signals. The initiator module identification signals identify the initiator of a transaction conducted over the bus. During bus cycles when the initiator is the bus master, B.ID3-0 transmits the slot or physical address of the initiator to the addressed slave. The B.ID3-0 signal is transmitted during cycles of address transfers, write data transfers and control transfers. The slot number is obtained by the initiator as a result of signals derived from the physical connection of the initiator module into the particular slot or connector on the back plane 70 of the bus 50. The slot number signal is created in each coupler 64 and 66, and is derived from the back plane connection represented at 110.

During read reply bus cycles, when the responder is the bus master, the B.ID3-0 signals are driven using the value saved by the responder from the read instruction previously supplied by the initiator. The initiator module, acting as bus slave, compares the value of the B.ID3-0 signal supplied by the responder bus master against its particular slot number and accepts the transfer only when there is a match. The B.ID3-0 information transfer signals are applied over four individual bus conductors 68. The B.ID3-0 signals are asserted and negated as shown in FIG. 3H.

The last of the information transfer signals is a signal, -B.NOC, which indicates that a response is coming from a special purpose memory module 58 instead of a general purpose memory module 56 (FIG. 1). An example of a special purpose memory module is one which is subject to updates from sources other than the bus. Since the contents of the special purpose memory module are subject to modification from sources outside of the bus, the contents of that special purpose memory must not be retained in a cache memory somewhere in the computer system, because cache coherence of such memories would not work properly. -B.NOC is asserted to indicate a special purpose memory which is noncachable. The use of the -B.NOC signal avoids the problem of determining at the original time of manufacture of the system, an address map which indicates those memory address locations which are cachable and those which are not. Such original manufacturing decisions may prove to be constraining at a later time. The use of the -B.NOC signal permits flexibility of changing the address map in an arbitrary manner in the future, without being constrained to make changes at initiators or in the original address maps.

In order to obtain effective communication between the various modules of the computer system, it is necessary for each of the modules to uniquely identify itself from all other modules on the bus. To avoid the problem of having to set each module to a particular identification when it is manufactured, and then possibly having the module installed incorrectly in an operating computer system, the preferred arrangement is to have a signal delivered to each module from its physical connection to the back plane 70. The back plane 70 has a plurality of connectors or slots into which the circuit board of each module is connected. Each slot location or connection to the back plane is unique, and is shown on FIG. 2 at 110. At each slot connection 110, a unique pattern of connections to a voltage supply and ground are present at that slot number. This unique arrangement of signals creates a 4 bit B.SLOT3-0 signal for each module. The B.SLOT3-0 signal is utilized in each module for module identification, as discussed above, as well as for what is known as geographic addressing. Geographic addressing is the ability to direct a control transaction to a specific slot regardless of what is connected to that slot.

A group of transfer control signals, and another group of transfer status signals are communicated between the transfer control logic element 108 of each iniator bus coupler 64 and the transfer control logic element 109 of each responder bus coupler 66. The transfer control signals define the type of transaction which occurs during each particular bus cycle, and determine the interpretation of the contents of the information transfer signals. The transfer status signals provide information from the slave to the master concerning the status of the transfer from the master to the slave which occurred during the previous bus cycle.

The transfer control signals are four mutually exclusive signals that indicate how the B.DAT31-0 information is to be interpreted during the bus cycle during which the B.DAT31-0 information transfer signals are present. The -B.AX signal is asserted when the B.DAT31-0 information contains address information. The -B.CX signal is asserted when the B.DAT31-0 signals contain control information. The -B.DX signal is asserted when the B.DAT31-0 signals contain write data, that is data to be written to memory. The -B.RX signal is asserted when the B.DAT31-0 signals contain read data, that is data having been retrieved from a memory. Thus, the B.DAT31-0 information is interpreted in four different ways depending on which of the four transfer control signals is asserted simultaneously with the B.DAT31-0 information. The four transfer control signals are mutually exclusive, meaning that only one of them may be asserted at a given time. If none of the transfer control signals is asserted, the bus is idle.

The transfer status group of signals is used to indicate attributes of the transfer that went on during the previous clock cycle. The -B.ACP signal indicates successful acceptance of the information that has been transferred. The -B.RET signal indicates that the responder which was addressed as the slave in the previous cycle was busy and that this transaction needs to be re-tried at a later point in time. The -B.ERR signal indicates an error condition.

The transfer control signals and the transfer status signals are separately designated because the relative timing of each group of signals is different. The transfer control signals are asserted and negated in conjunction with the assertion and negation of the information transfer signals. As is shown in FIG. 3I, the assertion and negation of the transfer control signals occur in the same cycle and in the same bus states as the assertion and negation of the information transfer signals. The transfer status signals are asserted and negated one bus cycle after the assertion of the first information transfer signal occurring during the first bus cycle of a transaction. Therefore, as is shown in FIG. 3H, the transfer status signals are asserted and negated during bus cycle T1, one bus cycle after the bus cycle T0 when the information transfer occurred.

The one of the transfer control signals which is asserted to identify address transfers is the signal -B.AX. Only initiators assert the -B.AX signal, and all the other transfer control signals are negated on cycles when the -B.AX signed is asserted. The format for the B.DAT31-0 signals when the -B.AX signal is asserted is illustrated in FIG. 7A. The assertion of the -B.AX signal causes all responders to decode the memory space address at field 88 (FIG. 7A). If selective updating of a doubleword is necessary on write or test and set transactions, this condition will be indicated by the state of the byte enable information transfer signals B.BE3-0. If the addressed responder is not capable of performing a transaction of the type and/or length requested by the assertion of the -B.AX signal, the addressed responder must reject the transaction by responding with a bus error status signal -B.ERR (FIG. 2) as a transfer status signal during the bus cycle immediately following the address transfer cycle. A memory scrub transaction is distinguished from a test and set transaction by having none of the B.BE3-0 signals asserted. In the case of test and set and memory scrub transactions, a null cycle, i.e. no transfer control signals asserted, must immediately follow the address transfer bus cycle to allow time for a cache coherence activity on any modules containing cache memories.

The one of the transfer control signals which is asserted to identify control transfers is the -B.CX signal. Only initiators assert the -B.CX signal, and all other transfer control signals are negated on cycles when the -B.CX signal is asserted. The assertion of the -B.CX signal causes all modules to decode the control doubleword information transfer signal at fields 96 and 98 (FIG. 7C). These two fields make up a four bit slot number and an eight bit control register address. All modules match the transmitted slot number against the value each module obtains from its own B.SLOT3-0 signal. In many cases the control function will be activated by the act of addressing the particular control register addressed by field 98. The 16 bit data word in field 100 may be ignored by the slave, but is available for use on control read request and control write activities.

The -B.DX control signal is asserted to identify write data transfers. Only initiators assert this signal, and all other transfer control signals are negated when the -B.DX is asserted. The assertion of the -B.DX signal causes the responder module addressed by the immediately preceding address transfer cycle (when -B.AX was asserted) to accept the contents of B.DAT31-0 as a doubleword of data to be written into the addressed memory location.

Read reply data transfers are identified by the assertion of the -B.RX transfer control signal. Only responders assert the -B.RX signal. All other transfer control signals are negated when -B.RX is asserted. The assertion of the -B.RX signal causes the initiator whose B.SLOT3-0 value matches the value of B.ID3-0 to accept the contents of B.DAT31-0 as a doubleword of data read from the requested memory location. In the case of read replies to control read transactions, the addressed control word is transferred on B.DAT15-0.

The transfer status signal which is asserted to indicate the successful receipt and acceptance of the information transfer during the previous bus cycle, is the -B.ACP signal. The -B.ACP signal is the expected response to all address transfer cycles when -B.AX is asserted, and to all control cycles when -B.CX is asserted.

The transfer status signal asserted to indicate that an addressed responder slave module is busy and that the transaction must be re-tried at a later time is the -B.RET signal. The -B.RET signal may only be asserted in response to address transfer cycles when -B.AX is asserted and in response to control cycles when -B.CX is asserted.

The busy responder asserts the -B.RET signal. The initiator which receives the asserted -B.RET signal waits for an assertion of a -B.RDY signal, indicating a non-busy or ready condition which will be discussed later, before the initiator retries the transaction.

The last one of the transfer status signals is a -B.ERR signal which is asserted to indicate a command error. The -B.ERR signal may only be asserted in response to address transfer cycles when -B.AX is asserted or in response to control cycles -B.CX is asserted. The addressed slave module asserts the -B.ERR signal if it is incapable of performing the requested transaction. As an example, a responder which only supports one and two doubleword reads will assert the -B.ERR signal if a request was received to read a four doubleword block from that memory module. The assertion of the -B.ERR signal overrides all of the other transfer status signals.

A typical initiator data path logic element 104 is illustrated in greater detail in FIG. 8. The "internal bus" is the internal data transfer path which communicates information from the other functional elements within the initiator module to and from the bus coupler on the initiator module. The characteristics of the internal bus are totally specific to the requirements of the individual initiator module and may be different on different types of initiators. The initiator data path logic elements includes an output address register 112 used to hold the address to be sent on to the bus conductors for data read and data write transactions. An output data register 114 transmits data to the bus conductors for data write transactions. An output control register 116 transmits control words to the bus conductors for control write transactions. An input data register 118 receives read responses from the bus conductors. An input control logic element 120 receives control transfers. The only type of control transfers recognized by initiators when addressed as slaves are control writes supplied by another module, so there is no need for response logic from an initiator to another initiator for control read functions. The purpose of initiator to initiator control functions is to allow one processor to send interrupt requests to another processor. The output signals of the input control logic element 120 are interrupt requests to the processor on the initiator module.

A 32 bit signal path 122 connects the various inputs and outputs of the 32 bit registers 112, 114, 116 and 118. During any active cycle, only one 32 bit information quantity is being transferred to or from one of the registers 112, 114, 116 or 118, so all of these various 32 bit registers may share the path 122 in a time multiplexed manner. A set of 32 bit bidirectional bus transceivers 124 connect the 32 bit signal path to the bus conductors 65 which conduct the B.DAT31-0 signals. The transceivers 124 are enabled inboard, except when the module is bus master to permit address decoding to take place.

A byte control logic element is connected to both the output address register 112 and output data register 114. The byte control logic element includes the necessary logic to indicate which of the 4 bytes, anywhere from 0 through 4, of the output data register contain meaningful information for the destination slave module. Depending on the implementation of the initiator, this may be derived from the outgoing address of the output address register 114 or from the loading of the output data register 112. The output signals of the byte control logic element 126 are the four B.BE3-0 signals driven onto the bus conductors 68 and amplified by a set of bus drivers 128 during address transfer cycles, when this module is bus master. Also driven onto the bus conductors 68 by the bus driver 128 during this time are the B.ID3-0 signals. The B.ID3-0 signals are a copy of the B.SLOT3-0 signals created at the slot of this module, and the B.ID3-0 signals inform the slave of the source of this transfer. The responder also uses these B.ID3-0 signals to direct its response back to the initiator who sent the request.

Comparators 130 and 132 are each 4 bit comparators which compare the B.SLOT3-0 signal of this module to the different quantities next discussed. In the case of the comparator 130 it compares B.SLOT3-0 to B.ID3-0 and is enabled when -B.RX is asserted, indicating a read response cycle on the bus. If the B.ID3-0 signal from the responder during a -B.RX cycle matches the B.SLOT3-0 signal of this module, a response is directed to this module, and an enable signal is sent from the comparator 130 to enable the input data register 118 to sample the incoming read reply data on signals B.DAT31-0. The other comparator 132 compares B.SLOT3-0 to bits numbers 27 through 24 (FIG. 7C) of the B.DAT31-0 signal during assertions of -B.CX during control cycles. In the control data word format, bits 27 through 24 are the slot number to which the control transfer is being directed. If during a -B.CX cycle, the comparator 132 detects a match an enable signal is sent to the input control logic element 120 which decodes other bits on B.DAT23-0 for generating interrupt requests.

If the module supports multiple doubleword transfers during read or write data transactions, the output data register 114 and input data register 118 may physically incorporate multiple 32 bit registers to hold the multiple doublewords.

FIG. 9 shows in greater detail the responder data path element 106. The major elements of the responder data path element include an input address register 134, an input data register 136, and an input control register 138, all of which are 32 bit registers, and an ID holding register 142 which is a 4 bit register. A 32 bit internal signal path 144 connects the registers 134, 136, 138 and 140. Since only one register is active during any active bus cycle, all of the registers 134, 136, 138 and 140 share the internal signal path 144 in a time multiplexed manner. A single set of 32 bit bus transceivers 146 are used to couple the B.DAT31-0 signals between the bus conductors and the registers 134, 136, 138 and 140. These transceivers are enabled inboard at all times except when a read reply is being transmitted.

The input address register 134 receives the address sent during -B.AX address transfer cycles and provides the address to the memory addressing logic employed on the module. The input data register 136 receives the data words sent during data write transactions and provides those to the memory data logic employed on the module. The input control register 138 receives the control words during control write cycles and provides them to the internal control logic of the module. The output data register 140 receives data read information from the memory on the module, or control read information from the control logic on the module, and makes it available to the bus 50 during reply cycles when -B.RX is asserted.

The selection of this module as a slave can come from either an address decoder 148 or from a comparator 150. The address decoder 148 decodes the contents of the bits 27 through 2 of the data bus during -B.AX cycles and determines whether the address falls within the range recognized by this module. If so, the address decoder 148 issues enable signals to the input address register 134 to cause it to latch the address, to a byte control logic element 152 to cause it to sample the contents of B.BE3-0, and to the identification register 142 to cause it to latch the contents of the B.ID3-0 signal. The B.BE3-0 signal sampled by the byte control logic element 152 indicates which bytes are of interest. The B.ID3-0 signal is latched so that if a read cycle is occurring the module identification is available to direct the response back through a transceiver 154 to the initiator module.

In the case of successfully decoding an address, subsequent -B.DX cycles without an intervening -B.AX cycle or an idle cycle, are recognized by the address decoder 148 which sends the enable signals to the input data register 134 so that it can capture the write data. The byte control logic 152 is not re-latched during data transfer cycles. A receiver 156 supplies the B.BE3-0 signals to the byte control logic element 152.

The comparator 150 is used during control cycles and is enabled by a -B.CX signal. The comparator 150 compares bits 27 through 24 from the transceiver 146 with the B.SLOT3-0 value of this module to determine if a control word is addressed to this module. If so, the comparator 150 enables the input control register 138 and the ID register 142 so that the module identification is available in case that this is a control read transfer and a reply will be necessary. The input data register 136 and output data register 140 may involve multiple 32 bit register entitites if the module supports multiple doubleword transactions. Signals B.DAT1-0 are sampled in the length control logic 149 during -B.AX cycles to determine the length of the requested transfer.

The transfer control logic 108 shown in FIG. 2 is not further broken down in detail, because the logic circuitry to implement such an element is determinable from the various signals described herein, and can be derived by one of ordinary skill in this particular art.

As is shown in FIG. 2, each initiator bus coupler 64 and 66 includes its own arbiter circuit 160 and each responder bus coupler 66 includes its own arbiter circuit 162. By distributing the arbiter circuits 160 and 162 on each bus coupler 64 and 66, arbitration can be fully determined and executed on a single bus cycle, as contrasted to the requirement for multiple bus cycles to fully execute arbitration with a centralized arbiter typical in some prior systems. With the distributed arbiter of the present invention, each bus cycle can be independently arbitrated, depending on the transaction. As a consequence, the speed and data throughput of the bus is increased, because the distributed arbiter does not require the roundtrip propagation delays of multiple bus cycles to establish the interlocked "handshaking" necessary for a central arbiter. The distributed arbiter does not require the cumulative delays of a bus grant daisy chain method of arbitration also common in prior buses.

The initiator arbiter circuitry 160 is somewhat different than the responder arbiter circuitry 162. A schematic diagram of an initiator arbiter circuit 160 is described below in conjunction with FIGS. 16A, 16B and 16C. The circuitry of a responder arbiter 162 is also discussed below in conjunction with FIGS. 16D, 16B and 16E. The timing and function attained by the arbitration group of signals conducted between the arbiters 160 and 162 over the bus conductors 68 can also be understood and appreciated from the following general description.

The arbitration group of signals are those signals used to allow various initiator and responder modules to contend for exclusive access to or "mastership" of the bus 50. The arbitration signals enable the distributed arbiter circuitry 160 and 162 to determine whether each particular module with which the arbitration circuitry is associated is to become the bus master during the next bus cycle. The arbitration occurs on a transaction by transaction basis, and in some instances the transactions are one bus cycle in length. The differences in operation and circuitry of an initiator arbiter and a responder arbiter are based primarily on the arbitration fairness between contending initiators, and on the priority given to responder modules over initiator modules, as will be discussed in greater detail below.

The arbitration group of signals includes a group of bus request signals -B.REQ14-0 designated by subscripts starting with 0 and progressing through one less than the total number of modules present in the computer system. The subscript number indicates the priority level of a module within the computer system, with lower numbered subscripts indicating higher priority status. In the example shown in FIG. 2, it is assumed that 16 modules are present in the computer system, and therefore 15 bus request signals (-B.REQ14-0) are supplied. A -B.REQ signal is not supplied from the module having the lowest priority (module 16, which would supply -B.REQ15 in this example), because the distributed arbiter on that particular module will automatically grant it bus mastership if no -B.REQ signals are asserted from modules having higher priorities.

A -B.REQ signal is asserted at the commencement of the B1 state of the cycle preceding that cycle which the module desires bus mastership. The -B.REQ signal is negated at the commencement of the B0 state of the cycle in which the module becomes the bus master. This is illustrated in FIG. 3L where the -B.REQ signal from a module is asserted at state B1 during cyle T0 and is negated at the commencement of cycle T1 when that particular module becomes bus master. Although not specifically shown in FIG. 2, whenever a module asserts a -B.REQ signal, it internally generates a -B.REQ-OUT signal indicating that particular module is requesting bus mastership. The outgoing -B.REQOUT signal is connected to the appropriate -B.REQ signal on the back plane as discussed below.

Another one of the arbitration group of signals is a pending request signal designated -B.PEND. The -B.PEND signal is asserted by modules which are requesting mastership of the bus but which will lose the arbitration for the next cycle. If two modules request mastership of the bus during the B1 state of the same bus cycle, that module of lesser priority will assert the -B.PEND signal because the lesser priority module has lost the arbitration in favor of the higher priority module. The assertion of -B.PEND indicates that more than one request is pending and therefore fairness in terms of priority needs to be applied. The mechanism used to implement arbitration fairness is that the assertion of -B.PEND inhibits the assertion of any new requests, i.e. -B.REQ, from any initiators not already asserting requests while old requests are still pending. The -B.PEND signal is generated by combinatorial logic on each arbiter 160 and 162, and therefore cannot be specifically identified with a particular bus state during a given bus cycle. -B.PEND is an open collector, or wired OR, signal shared by all modules which are contending for bus mastership. Generally speaking, however, the -B.PEND signal will be asserted and will be negated sometime during the time period between the commencement of the B1 and B2 bus cycles. Although the timing is not precisely illustrated, a -B.PEND signal is illustrated in FIG. 3M for the purposes of general understanding of timing relationships. The arbiter circuitry in all modules can assert -B.PEND, but only the arbiter circuits 160 in the initiator modules receive the -B.PEND and employ it in the arbitration technique.

The -B.HOLD signal of the arbitration group of signals is asserted by the module which is the bus master when that module is performing a transaction over the bus and the transaction requires the use of the next consecutive bus cycle. The assertion of the -B.HOLD signal overrides normal arbitration and allows the then current bus master module to retain control of the bus over the next cycle or cycles. The -B.HOLD signal is asserted from the B1 state of the first bus cycle until the B1 state of the bus cycle which immediately precedes the bus cycle when the module will relinquish bus mastership. Thus, the assertion of the -B.HOLD signal is negated one cycle before the end of the transaction. FIG. 3N illustrates the general timing of the -B.HOLD signal.

One signal which has significance both as a transfer status signal and also as an arbitration signal is the ready signal designated -B.RDY. The -B.RDY signal is used to indicate that a previously busy responder module is no longer busy and has become ready to accept a transfer. The assertion of the -B.RDY signal indicates that an initiator can re-try a previously attempted transaction to a responder. The -B.RDY signal is only asserted by responders which have asserted the -B.RET transfer status signal during the busy period which is ending upon the assertion of the -B.RDY signal. The -B.RDY signal is an open collector, or wired OR, signal shared by all responder modules as a means of indicating that they have become ready after having previously been busy. Responder couplers 66 set an internal flag whenever they report -B.RET transfer status because they are busy and unable to accept a transaction. Subsequently, when the responder coupler becomes ready with this internal flag set, the responder coupler asserts -B.RDY for the clock cycle immediately preceding the ending clock cycle when the responder module is no longer busy. The assertion of -B.RDY is monitored by all initiator modules which are waiting to do a re-try.

The receipt of a -B.RDY signal by a waiting initiator causes the waiting initiator to request the bus for a retry. Because the bus request will require at least one bus cycle to gain bus mastership, the responders should assert the -B.RDY signal one bus cycle before the responder actually becomes ready. The -B.RDY signal may be asserted on the same bus cycle as the assertion of the -B.RET signal, if the responder is in its last or next to the last busy cycle when the request is received. The relative timing of the -B.RDY signal is illustrated in FIG. 3K.

When a previously busy responder module asserts -B.RDY, the -B.RDY signal forces all initiator modules with -B.REQOUT asserted to temporarily rescind their request by negating -B.REQOUT until -B.RDY is negated. All initiator modules waiting to re-try respond to the -B.RDY signal by once again asserting -B.REQOUT. This gives the re-trying initiators temporary precedence over initiators attempting to initiate new transactions, overriding arbitration fairness. This results in an aggregate reduction in waiting time by servicing re-tries faster.

The operational nature of the bus may be referred to as "pipelined". Pipelined refers to the fact that there are three components to each transfer activity which occur at three sequential bus cycles. During the first cycle, arbitration selects the master of the bus for the next sequential or second cycle when the information transfer and transfer control signals are present. The transfer status signals are presented during the third sequential cycle to indicate status of the preceding second cycle. In effect, the bus during a given cycle is used for the purpose of communicating the transfer information and transfer control signals from the selected master to the slave during that cycle. The master must have won an arbitration activity in the bus cycle preceding the information transfer, and in the bus cycle following the information transfer the master will receive a transfer status signal indicating whether the transfer was accepted by the addressed slave, or whether the master needs to re-try or whether the addressed slave can even accept the transfer.

Figure 10:
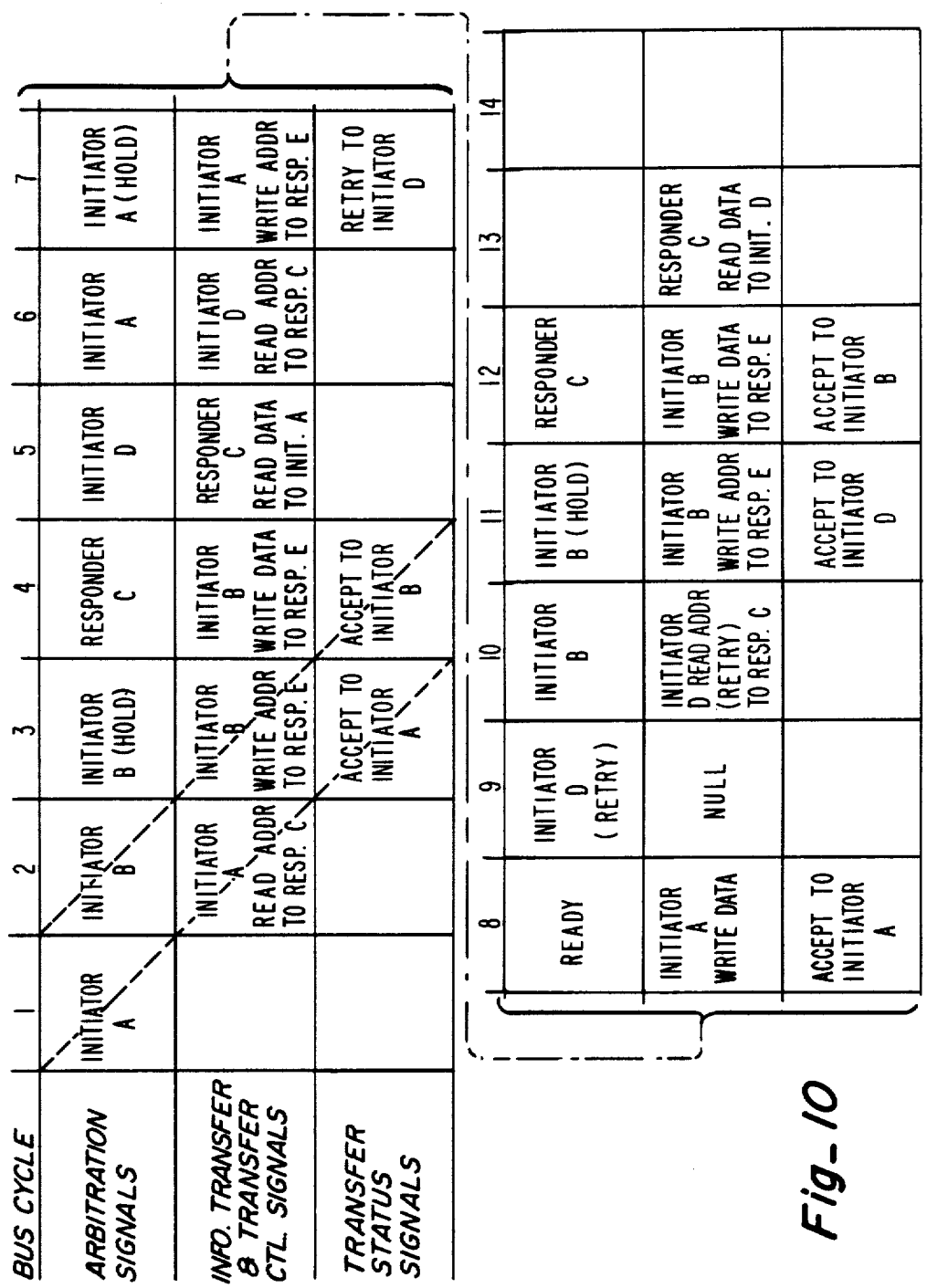
FIG. 10 is a chart illustrating the split transaction nature of operation of the bus shown in FIG. 2, with respect to the arbitration signals, information transfer and transfer control signals, and transfer status signals, during successive cycles of the bus, under a variety of different arbitration situations.

The transactions illustrated in FIG. 10 are representative and are not exhaustive of the types of activity that can occur on the bus. The chart of FIG. 10 shows the three principal groups of signals: the arbitration group; the information transfer and transfer control groups; and the transfer status group, in three separate horizontal rows. Successive bus cycles are shown in the vertical columns. A dashed diagonal line illustrates a single transaction which takes place successively in three bus cycles, and which includes all the groups of signals. At any given cycle each of these three signal groups are indicating activities associated with different transactions because of the time sequencing, although one or more of the groups may be idle if there is no need for assertion of that group during that cycle. Each activity of each signal group takes exactly one cycle. In the row for the arbitration signal group, what it is indicated for each cycle is that module which is the winner of the arbitration during that cycle, i.e., the module that will become bus master on the next cycle. As is discussed later, there may be cases where more than one request is pending during a cycle but this will be resolved by the arbitration techniques described below. In the row for information transfer and transfer control signal group, the activity of the bus master is shown as well as the slave to which it is transferring information. In the row for the transfer status signal group the status of the transfer is shown being sent back to the master of the previous cycle's transfer for the purpose of acknowledging the transfer activity.

A read transaction occurs during cycles 1, 2 and 3. During cycle 1, initiator A won the arbitration and became the bus master in cycle 2. During cycle 2, initiator A transferred the read address to responder C. During cycle 3, responder C sent an accept signal (-B.ACP) back to initiator A indicating the successful receipt of the read address transferred during cycle 2.

A single doubleword write data transaction is illustrated by the activities occurring in cycles 2, 3, and 4. In cycle 2, initiator B won the arbitration and became bus master in cycle 3. In cycle 3 initiator B sent the write address of data it wishes to transfer to responder E. In cycle 4, responder E signaled to initiator B that it had accepted the write address. Simultaneously in cycle 4, the initiator B wrote the data to responder E at the address transferred in cycle 3. Because a single doubleword write data transaction requires two consecutive bus cycles, during cycle 3, an arbitration hold signal (-B.HOLD) was supplied by initiator B to prevent other modules from gaining access to the bus so that the data written to responder E could be transferred during cycle 4. Because of the assertion of the hold signal by initiator B at cycle 3, no transfer status signals occurred in cycle 5, since the status of the transfer had previously been acknowleged in cycle 4. For those information and transfer control transfers which require multiple sequential bus cycles, the status of the transaction is reported only in the next bus cycle following the first bus cycle in which the initiator first sent the information transfer and transfer control signals of the transaction. Information transfer cycles when a responder is bus master are not acknowledged by transfer status.

A busy response is illustrated in cycles 5, 6 and 7. In cycle 5, initiator D won the arbitration and became bus master in cycle 6. In cycle 6, initiator D initiates a read transaction to responder C. In cycle 7, initiator D receives a signal that responder C was busy at the time the transfer was attempted. The transaction attempted in cycle 6 will therefore be re-tried when responder C is ready. On the next cycle 8, a ready indication was supplied and received by initiator D. Initiator D re-requested the bus in cycle 9 as a re-try, re-tried the read address transfer in cycle 10, and subsequently received an acknowledgement of acceptance in cycle 11. Ultimately, responder C transfers the read data back to initiator D in cycle 13, after responder C gained bus mastership as a result of the arbitration in cycle 12. Other examples of bus cycle activities are illustrated in FIG. 10.

One of the significant advantages of the operation of the bus of the present invention is that the transfer status signals are delivered one bus cycle after the information transfer and transfer control signals are delivered. As a consequence, the initiator knows as soon as possible of the status of the transfer. By delivering the transfer status signals as soon as possible after the transfer of information or control signals, bus congestion is decreased in the presence of busy responders. Furthermore, on multiple doubleword write transactions, the initiator learns during the cycle in which the first doubleword is transferred whether the slave can accept the write data transaction. If the slave cannot accept the write data transaction, the write data transaction can be aborted after the first doubleword has been transferred and before the other doublewords of the transfer have been sent. Bus bandwidth is increased by delivering the transfer status signal immediately in the next following cycle after which the information and control signals are first transferred, so other transactions can proceed immediately without waiting for many bus cycles before the status is reported.

The arbitration technique of the present invention involves the use of fairness to resolve contending requests from modules of different priorities, precedence to responders with no regard for previously pending requests from initiators, and temporary precedence for modules that are re-trying by rescinding any pending requests. The fairness in the arbitration of the present invention applies only to requests arriving at the same bus cycle. Fairness is applied by giving bus mastership to the requesting module of the highest priority first and then to each contending module in descending order of priority. During the time period that multiple requests are pending, no other requests will be recognized. This fairness applies only to initiators. Responders are given priority over all initiators, and fairness is applied to resolve contentions between competing initiators. Re-trying initiator modules are given precedence over all pending requests from all other initiator modules. If a re-trying module is unable to make a transfer to a given module because that module has become busy, and the re-trying module has attempted a predetermined number of re-tries, absolute precedence is given to this re-trying module by means of locking the bus into an idle condition until the transfer can occur from the re-trying initiator to the previously busy responder.

In terms of the signals previously described, the arbitration fairness technique is that a module asserting -B.REQOUT signal will be granted bus mastership provided that no other module is also asserting a -B.REQOUT signal during that given bus cycle. When two or more modules assert -B.REQOUT in the same bus cycle, the module with the highest priority will be granted bus mastership, and a -B.PEND signal will be asserted by the lower priority module(s) indicating that there are other pending requests which must be serviced in priority order before any newly asserted requests from initiators can be considered. Each remaining pending -B.REQOUT signal will be serviced in priority order until all of the pending requests have been serviced. No other initiator may assert a -B.REQ-OUT signal so long as there are other pending requests, i.e. -B.PEND is asserted. A responder does not have to wait for the negation of the -B.PEND signal, but may assert its -B.REQOUT signal at any time during the pendency of other requests. Since responders are automatically given higher priority than initiator modules, the assertion of the -B.REQOUT signal by a responder during the pendency of other requests from initiators will immediately result in the granting of bus mastership to the responder. When two responders are asserting -B.REQOUT, bus mastership will be resolved between the two responders on the basis of their assigned priorities. When a previously busy module asserts -B.RDY, indicating that it is no longer busy, all initiators asserting their -B.REQOUT signals will negate their -B.REQOUT signals to give temporary precedence to those modules seeking to make re-tries.

The arbitration technique implemented in the present invention improves data throughput by eliminating excessive re-tries which occur in some prior split transaction buses. By giving the responder absolute priority over the initiator, and allowing the responder to make its response even though an initiator may have made a request earlier, an initiator waiting on the responder to make the response is not further delayed. Causing waiting initiators to re-try only in response to the ready indication (-B.RDY), reduces the possibility of re-trying modules needlessly using bus capacity when a busy responder has not yet become ready. This is a particular advantage over some prior bus arbitration arrangements which require re-tries to be issued after arbitrary or fixed time delays. A module which re-tries after a fixed or arbitrary delay may still encounter a busy slave. The use of a single ready signal has the advantage of reducing the number of electrical conductors and connections required to initiate re-tries in response to the ready signal.

A re-trying module is given absolute mastership of the bus after it has re-tried a predetermined number of times and failed. An absolute upper bound or limit is thus placed on the delay which this re-trying module will experience. Of course, the bounded limits will only come into play if the re-trying module has been unsuccessful in spite of the very high probability that it could have achieved a transfer after only one or two re-tries.

The purpose of rescinding requests is to give a re-trying module precedence for access to the bus over other initiators who are waiting to initiate new activity at the same time as a re-try becomes possible is to more fairly allocate bus bandwidth, since other initiators waiting for a new initiation at a time when a re-try is possible may make the responder to which the re-try is going to be directed busy again, and occasion additional re-tries. While rescinded requests do not eliminate that possibility they make it much less common. The -B.RDY signal is a single party line signal which indicates to all initiators waiting for re-tries, that some responder which had previously been busy and requested a re-try is now able to accept a re-try. There could be more than one initiator awaiting a re-try to the same or to a different responder. It is therefore the case that if several initiators are awaiting re-try to a single responder the assertion of -B.RDY will cause all of those waiting initiators to initiate their request simultaneously and possibly the lower priority ones may encounter an additional re-try because the responder may go busy from the higher priority re-try. It is also the case that if several initiators are awaiting re-tries to several responders, when the first of those responders goes ready, all the initiators will re-initiate requests, some of which will be re-tried by the still busy module(s) other than the one that asserted the ready signal. The reason that these two conditions, while they can and do occur, are not major problems is that they are very infrequent. The duration of time in which modern modules remain busy during a cycle are measured in, at most, a few hundred nanoseconds, i.e., maybe one, two or at most three bus cycles. Accordingly, there is not a long period of time for other requests to be re-tried during the time that a single module is awaitng re-try. The maximum number of modules that may be awaiting re-try is typically no more than one and very rarely is there an opportunity for there to be more than two. The other significant point is that this is a highly efficient implementation because it requires only a single bus conductor with only a single driver and single receiver to prevent the common problem which plagues prior buses, wasted re-tries that have been occurring before the destination module is ready or wasted time because the re-try was delayed beyond the point when the destination is ready. To be able to prevent this problem with a common signal is quite efficient.

FIG. 11 illustrates the arbitration technique of the present invention in an example of multiple requests. Fairness in the arbitration technique is significant only in resolving bus mastership between requests which arrive during the same bus cycle. The arbitration fairness causes lower priority requests arriving at earlier bus cycles to take precedence over higher priority requests arriving at later bus cycles. In the example shown in FIG. 11, the responder 0, the initiator 5, and the initiator 12 all assert bus request signals during cycle 0. As a result of the multiple requests asserted at the same bus cycle, the -B.PEND signal is also asserted during the 0 bus cycle. Since responder 0 has the highest priority, it negates its -B.REQ0 signal in cycle 1 during which it is bus master. During bus cycle 1, the initiator 5 is the highest priority module, and it becomes bus master during cycle 2 and negates its -B.REQ5 signal. During cycle 1, the initiator 9 became ready to assert its -B.REQ9 signal, but was prevented from doing so by the assertion of the -B.PEND signal by modules 5 and 12. The initiator 9 is prevented from asserting its -B.REQ9 signal until all the pending requests issued in bus cycle 0 have been serviced. The transfer accomplished by initiator 5 commencing at bus cycle 2 requires two consecutive bus cycles, and accordingly -B.HOLD is asserted by initiator 5 during cycle 2 and is negated during cycle 3. In cycle 3, the request from initiator 12 is the only outstanding request, and accordingly it will receive bus mastership on cycle 4 so the -B.PEND signal is negated during cycle 3.

In cycle 4, responder module 0 and initiator module 9 assert simultaneous requests. Cycle 4 is the first opportunity for initiator 9 to assert its request, even though such a request was preferred in cycle 1. The assertion of the -B.PEND signal delayed the request of initiator 9 until cycle 4. In cycle 4, because of the assertion of requests by responder 0 and initiator 9, the -B.PEND signal is again asserted. The responder module 0 assumes bus mastership in cycle 5 and negates its -B.REQ0 signal during cycle 5. Also during cycle 5, responder 1 asserts its -B.REQ1 request signal. Since requests by responders are not delayed by the assertion of -B.PEND and are given priority over all initiators, responder 1 becomes bus master in cycle 6 and negates its -B.REQ1 signal in cycle 6. Since the request of initiator 9 is the only remaining request during cycle 6, the -B.PEND signal is negated during cycle 6 and initiator 9 becomes the bus master in cycle 7.

In cycle 8, responder 0 and responder 1 assert simultaneous requests. The -B.PEND signal is asserted as a result of the simultaneous requests. Since responder 0 is of higher priority than responder 1, responder 0 becomes the bus master in cycle 9 and remains the bus master in cycle 10 as a result of the assertion of the -B.HOLD signal during cycle 9. In cycle 10, the -B.HOLD signal is negated and the request of responder 1 is the only outstanding request. The -B.PEND signal is therefore negated. Responder 1 becomes the bus master in cycle 11. In cycle 11, initiator 12 asserts its request, which has been delayed by the assertion of -B.PEND from cycle 9. Initiators can assert their requests only upon negation of the -B.PEND signal.

FIG. 12 shows an arbitration example of a rescinded request. Initiator 12 requests the bus without contention in cycle 0, receives the bus during cycle 1, performs information transfer to responder 0, and receives a re-try in cycle 2 because responder 0 is busy (the origin of which is not shown). Also in cycle 2, the point at which initiator 12 gets back the re-try indication, responder 0 is ready to send a response on the bus so it requests the bus, and performs its transfer during cycle 3. As a result, responder 0 goes not busy, which it indicates by assertion of -B.RDY in cycle 3. The assertion of -B.RDY in cycle 3 allows initiator 12 to reassert its request during cycle 4. However, during cycle 3, initiators 5 and 9 both requested the bus. Initiator 5 received the bus during cycle 4 and initiator 9 had to wait. Initiator 9 would have won the arbitration in cycle 4 and would have become master in cycle 5, had it not been for the assertion of -B.RDY. The -B.RDY signal had two effects: it caused initiator 9 to rescind its request as shown in cycle 4 and it allowed module 12 to assert its request in cycle 4. The -B.PEND signal was asserted by module 9 at the time when module 5 was also contending for the bus, and -B.PEND remains asserted during the period the request is rescinded due to the assertion of -B.RDY. Requests can be re-enabled due to an assertion of -B.RDY without regard to the assertion of -B.PEND. Because there are no other pending re-tries module 12 becomes master in cycle 5 and performs its information transfer. Module 9 becomes master for cycle 6 and, due to its assertion of -B.HOLD, also for cycle 7.

FIG. 13 shows an arbitration example of multiple re-trying initiators and a rescinded request. In cycle 0, module 7 requests the bus, receiving it in cycle 1 and gets a re-try in cycle 2. Module 12 requests the bus in cycle 1, receives it in cycle 2 and gets a re-try in cycle 3. Two initiators 7 and 12 are now waiting to do a re-try. During cycle 3, module 0, which is the busy responder, requests the bus and simultaneously asserts -B.RDY. The -B.RDY signal allows both modules 7 and 12 to assert bus requests during cycle 4. Module 5 also made a contending request with module 0 during cycle 3, resulting in the assertion of -B.PEND by module 5. Of course, due to -B.RDY the request of module 5 is rescinded during cycle 4. Modules 7 and 12 both request the bus during cycle 4 due to the assertion of -B.RDY. Module 1, which is a responder, also requests the bus in cycle 4, and is allowed to do so because responders consider neither -B.RDY nor -B.PEND in choosing when to request the bus. In cycle 4 there are three contending requests, and module 1 wins because it is the highest priority. For cycle 5, a response by a responder (module 1) cannot make another responder go busy so module 7 wins the arbitration during cycle 5 and it is master during cycle 6. Module 12 wins the arbitration during cycle 6 and it is master during cycle 7. Module 5 does not reassert its request until cycle 7. The rescinding of a request due to -B.RDY only accounts for the request not being present in cycle 4. Had it not been for the presence of multiple other requests already pending, -B.REQ5 would have been reasserted during cycle 5. However, modules 7 and 12 were asserting -B.PEND at that time because they had lost the arbitration to module 1.

This assertion of -B.PEND prevented module 5 from reasserting its request until finally module 7 got its service and module 12 was the only outstanding request. This is what ensures that the single cycle of request rescindment is sufficient to let all of the multiple re-trying initiators get in and get bus access before any other initiators even though there might be more than one of them and they might be lower in priority than a module that rescinded its request.

Also -B.PEND did not get negated during cycle 6 but waited until cycle 7, even though during cycle 6 there was only one request active on the bus. This is because once -B.PEND has been asserted by a module, it remains asserted by a module even if its request is rescinded until it gets service. Since module 5 had been asserting -B.PEND during cycle 3, -B.PEND remains asserted during cycle 7 and does not negate until module 5 becomes bus master in cycle 7. This has the advantageous effect of preventing other modules of higher priority from contending for the bus during that last cycle of re-tries when there are multiple initiators attempting to re-try concurrently. Otherwise, when module 12's request was the only request actually outstanding, -B.PEND would have negated and allowed another initiator to assert its request. By holding -B.PEND until module 5 becomes master it ensures that module 5 gets service as soon as it is able to after the rescindment since module 5 had actually begun trying to get the bus back in cycle 3. It would not be in accord with fairness for a priority 4 initiator to get control of the bus by requesting in cycle 7, for example.

FIG. 14 shows the case where despite all of the situations discussed before to prevent this case from occurring, such as rescinded requests, multiple re-tries to a single request occur. This is not a common, but is a possible, occurrence and there is an upper bound on how many of these re-tries can occur. The typical case where such a condition can occur is where a given initiator incurs a re-try due to encountering a busy responder and simultaneous with that responder becoming ready, another initiator with a request already pending, makes it busy again. This repeating may occur several times in an environment where there is heavy bus load and this is illustrated in FIG. 14. The initiator in the example is module 5 and the responder with which all of the inititors 5, 9 and 12, are attempting communications is responder 0. For simplicity, all of the transactions are one doubleword in length.

As the example begins, module 0 is busy in cycle 0, and module 5 makes a request, becomes bus master in cycle 1, and receives a re-try from module 0 in cycle 2. At the same time as it is rejecting requests from module 5, module 0 is also requesting the bus to perform a reply and becomes not busy. Responder 0 becomes master in cycle 2 and asserts -B.RDY at the same time. However, module 9 already has a request outstanding and, being the only requestor during cycle 2 it becomes master during cycle 3. Had module 9 not become master during cycle 3 it would have had to rescind its request due to the assertion of -B.RDY in cycle 2. However, that is not the case here where module 9 makes a transfer to module 0, making it busy again. Therefore, even though module 5 without contention re-requests the bus in cycle 3 and becomes master in cycle 4 it gets a re-try in cycle 5. Module 0 requests the bus in cycle 5 for its reponse indicating ready during cycle 6. Module 12 requests the bus during cycle 6 and becomes master in cycle 7 before it could be forced to rescind its request and thus made module 0 busy again. Module 5 re-requesting as a result of the -B.RDY in cycle 6 wins the arbitration in cycle 7, becomes master in cycle 8 and receives re-try again in cycle 9.

Note that in coincidence with re-requesting the bus in cycle 7 module 5 also asserted -B.PEND even though no other requests were pending at the time. This is the action of the bounding function of the arbitration circuit shown in the bottom of FIG. 16C. -B.PEND is asserted starting in cycle 7 and even though module 9 would have requested the bus in cycle 8 it is not allowed until cycle 14. The assertion of -B.PEND under these circumstances assures once module 0 becomes able to finish its existing operation, which it did in cycle 10 and indicating ready in cycle 10, there will be no conflict and module 5 will become the bus master.

Cycle 11 is idle as module 5 requests the bus v, and in cycle 12, module 5 is the master. Cycle 13 is idle because -B.PEND is still asserted and finally cycle 14 is idle because it is not until cycle 14 that module 5 is able to negate -B.PEND upon receiving the accept status signal during cycle 13. Finally, in cycle 14, module 9 is able to request the bus and subsequently become master in cycle 15.

At least three of these idle cycles, those cycles 11, 13 and 14, are a direct result of the forcing access to the bus by module 5. However, the alternative would have been to allow potentially more repetitions of this case where by the time module 5 could do a re-try, module 0 was busy again. The choice of two unsuccessful re-tries before forcing access is a considered number based on the fact that one re-try is relatively common, two re-tries are quite uncommon and the possibility of three only exists where this exact type of overlap has occurred repeatedly. Once it begins occurring, it is very likely to continue because of the conditions of microprocessors that allow it to occur, and it is likely to continue for some length of time. The only gain of making the re-try count more than three would be to incur further wait states by the re-trying module. In the case of repeatedly making the same module busy during the very same cycle as it asserts -B.RDY, which is the one cycle that is too soon for the rescinded request to have effect, if it occurs twice in a row there is a high probability that it will continue to occur, so bus mastership waiting time is bounded, with -B.PEND used to force non-conflicting bus access on the 3rd occurrence.

FIG. 15 shows a portion of the physical wiring connectors 164 by which each responder and initiator module is connected to the mother board or back plane 70 (FIG. 2). FIG. 15 also shows the electrical connection of the -B.REQOUT signals from each module to all of the modules in the computer system of less priority. The connection pins of the connectors 164 are represented by small circles, and those small circles which have darkened interiors represent the situation where one of the conductors is connected to a connection pin. Each connector 164 illustrates only fifteen connection pins, but the actual connectors 164 have pins for conducting all of the bus signals. The bus signals are simply bused directly with a connection to each module and terminated at each end of the back plane. The clock signals are distributed from the clock generator 74 (FIG. 2) through special dedicated equal length signals to each module. The slot number identifier signals -B.SLOT3-0 are not bused between modules, but are in fact hard wired to the binary representation of the slot number at each connector 164 by a hard wired connection of pins.

The bus request signals, B.REQ14-0, are handled in a different manner, as illustrated in FIG. 15. At each slot there is a pin dedicated to outgoing requests -B.REQOUT from that module. Strictly speaking the -B.REQOUT signal is not bused between modules because it is connected to a bus signal differently at each slot. The circuitry within the arbiter on each bus coupler places its outgoing request on the -B.REQOUT pin at its slot, and the -B.REQOUT is connected to a -B.REQ14-0 pin for each slot or module of lesser priority. Modules of higher priority are connected into lower numbered slots. All of the responder modules are connected into the lower numbered slots and all initiators are located in slots of higher numbers than the highest numbered slot into which any responder is connected. Therefore, slot 0's -B.REQOUT becomes -B.REQ0 as seen by slots 1-15. Slot 1's -B.REQOUT becomes -B.REQ1 as seen by slots 2-15. Slot 2's -B.REQOUT becomes -B.REQ12 as seen by slot 3-15. The arrangement continues in this manner.

The outgoing request is only physically connected to lower priority slots. There is no connection made at the higher priority slots to the lower priority -B.REQ signals. The -B.REQOUT signal from a module is conducted by a conductor (e.g. 166) to all of the -B.REQ pins of a corresponding number in all the connectors 164 to lower priority modules. Pull-up resistors (only one 168 is shown) are connected to each of the pin on each module so that signals at these pins appear negated by having the logic high state. For example, since there are no connections to any of the pins at -B.REQ14-10 in slot 0, the highest priority module will never see the assertion of any -B.REQ signals. Yet with no change, the same module circuit card may be plugged into slot 9, the module will see the higher priority requests from slots 8, 7, 6, 5, 4, 3, 2, 1 and 0, while not seeing the lower priority requests from slots 10, 11, 12, 13, 14 and 15.

With no switches, jumpers or circuitry changes, the prioritization or priority assignment is implemented by connecting the modules in the connectors 164 shown in FIG. 10. For instance, in FIG. 11 where modules 0, 5 and 12 in cycle 0 all assert requests, module 0's request, because it is taken by the wiring arrangement shown in FIG. 15 from -B.REQOUT at slot 0 to all other slots 1-15, the assertion of -B.REQ0 is seen electrically by the module in slot 5 and the module in slot 12. The assertion of -B.REQOUT at slot 5 is wired so that it is seen by the module in slot 12, but not by the module in slot 0. And the assertion of -B.REQOUT at slot 12 is seen by the modules in slots 13, 14 and 15 but not by either modules 5 or 0. The priority recognition on the modules is easily implemented since if none of lower priority -B.REQ14-0 and -B.HOLD signals are asserted, a module becomes a new bus master by simply evaluating the request signals.

Figure 16A:
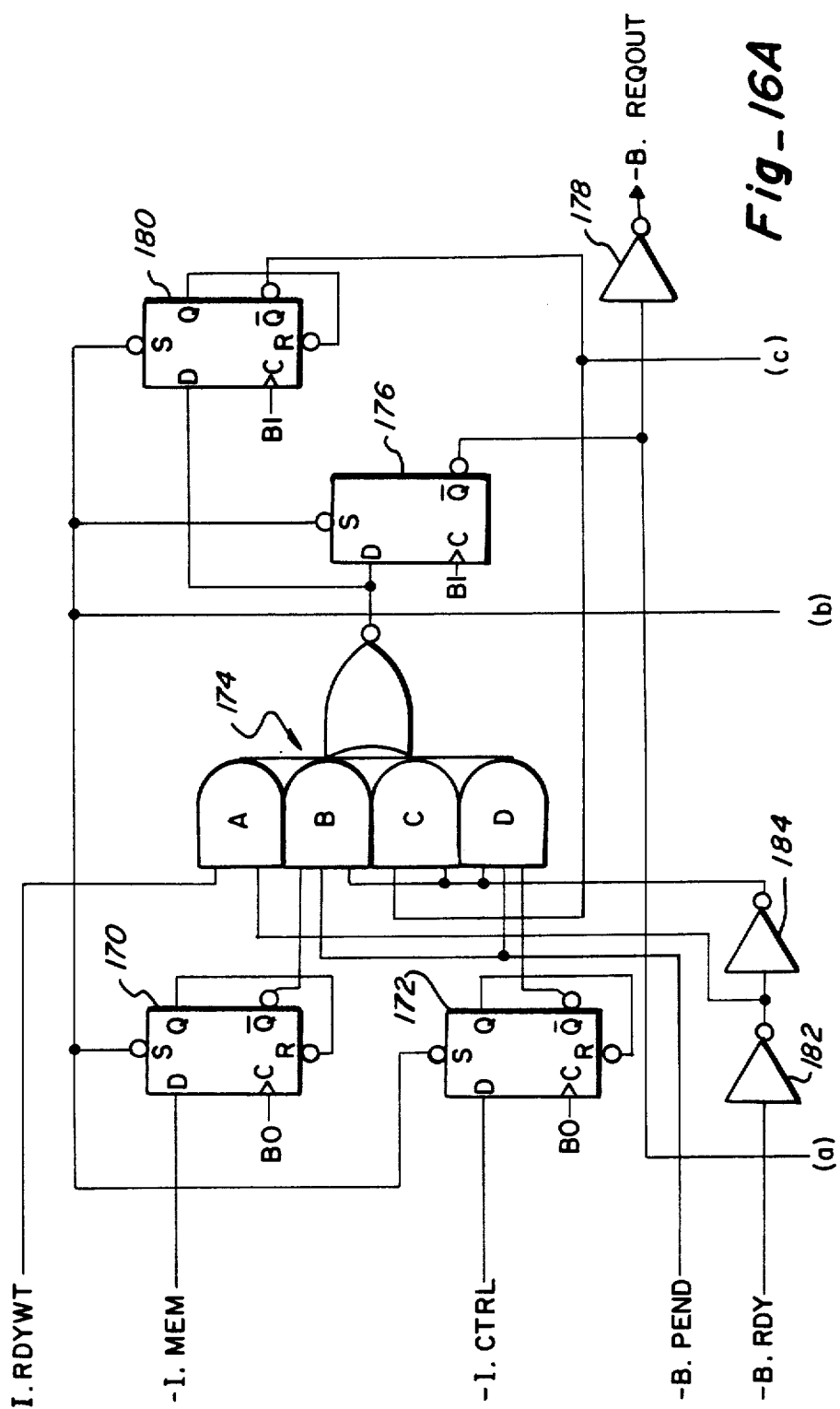

The idealized logic circuitry for implementing the arbitration technique of the present invention in an initiator module is illustrated collectively in FIGS. 16A, 16B and 16C. FIGS. 16A and 16B are to be connected together at the points (a) and (b). FIGS. 16B and 16C are to be connected together at the points referenced (d) and (e). FIGS. 16A and 16C are connected together at point (c). Collectively, the FIGS. 16A, 16B and 16C form the initiator arbiter 160 shown in FIG. 2.

The portion of the initiator arbiter shown in FIG. 16A functions as means for generating the -B.REQOUT signals from each initiator module. The initiator arbiter will create a -B.REQOUT signal in response to signals from other components of the initiator module to conduct either a memory space operation or a control space operation. The signal -I.MEM is supplied from the other components of the initiator module in order to conduct a memory space operation. The -I.CTRL signal is supplied by the other components of the initiator module in order to conduct a control space operation. The negative prefix in front of the signal names indicates that the signal is asserted when logically low. The signal names beginning with the "I." are those which are generated by other or internal components of the module and are supplied to the bus coupler. The -I.MEM and -I.CTRL signals are mutually exclusive, because the module will conduct only memory space operations or control space operations in a bus cycle, but not both simultaneously.

A flip-flop 170 receives the -I.MEM signal at its D input terminal and is clocked on the B0 clock state signal applied to the C input terminal. The -I.CTRL signal is applied to the D input terminal of a flip-flop 172, and the state of the flip-flop 172 is clocked on the B0 clock state signal applied at its C terminal. Whenever one of the -I.MEM or -I.CTRL signals is applied to the flip-flops 170 or 172, respectively, the initiator arbiter will seek to become the bus master by delivering the -B.REQOUT signal. Because the Q outputs of the flip-flops 170 and 172 are wrapped around to the overriding clear or R inputs, once the flip-flops 170 and 172 are set at the edge of the B0 clock state signal, these flip-flops remain set until cleared by an override input supplied at the set terminal S. The flip-flops 170 and 172 effectively latch an output signal indicating a bus request upon the application of one of the -I.MEM or -I.CTRL signals.

An AND/OR/INVERT gate 174 is means for implementing arbitration fairness and for rescinding requests in accordance with the arbitration technique of the present invention. The output signal from the AND-/OR/INVERT gate 174 is applied to the D input of a flip-flop 176. The B1 clock state signal is applied to the C input terminal of the flip-flop 176. An output signal is supplied from the Q bar terminal of the flip-flop 176 in sychronization with the leading edge of the B1 clock state signal. The Q bar output signal from flip-flop 176 is inverted through an inverter 178 and becomes the -B.REQOUT signal for this module. The output signal from the AND/OR/INVERT gate 174 is also supplied to the D input terminal of a flip-flop 180. The B1 clock state signal is applied to the C terminal of the flip-flop 180. Since the flip-flops 176 and 180 both receive the same input signal on their D terminals and are clocked by the B1 clock state signal simultaneously, both flip-flops 176 and 178 change state simultaneously. The Q output of flip-flop 180 is wrapped around to its overriding clear input, and therefore latches the flip-flop 180 in a condition indicating a request. The Q bar output signal from flip-flop 180 is applied as one of the input signals to the C AND portion gate of the AND/OR/INVERT gate 174 and is also present at point (c). The signal at point (a) is the inversion of the -B.REQOUT signal.

The AND/OR/INVERT gate 174 functions to implement fairness and rescind requests in accordance with the levels of the various input signals applied to it. The output signals from the flip-flops 170 and 172 are applied to the input terminals of the B and D AND gate portions of the gate 174. The signals from the flip-flops 170 and 172 are conducted through the B and D AND gate portions only when the -B.PEND signal is not asserted and the -B.RDY is not asserted. Upon assertion of either the -B.PEND signal or the -B.RDY signal, the output signals from the B and D AND gate portions go low. Thus, either the assertion of the -B.PEND signal indicating that prior requests are outstanding will prevent the initiator arbiter circuit portion shown in FIG. 16A from creating its own -B.REQOUT signal. Similarly, the assertion of the -B.RDY signal will terminate the output signal from the gate 174. After pending requests have been rescinded upon the assertion of the -B.RDY signal, which exists for only one bus cycle, a request is reinstituted as a result of the Q bar signal supplied by flip-flop 180 to one input terminal of the C AND gate portion of the gate 174. The wrap around signal from the Q output of flip-flop 180 causes the flip-flop 180 to remain latched even when the assertion of -B.PEND and/or -B.RDY will cause flip-flop 176 to change states. Upon the negation of the -B.RDY and/or -B.PEND signal, the presence of the Q bar output signal from 180 causes the C AND gate portion to create a signal which gate 174 supplies to the D input terminal of flip-flop 176, thus reinstituting the request or initiating a request which was previously delayed due to the assertion of -B.PEND.

In the case where the initiator module is waiting for a re-try, the I.RDYWT signal will be asserted as one input to the A AND gate portion of the gate 174. The other input signal to the A AND gate portion of the gate 174 is the inversion of the -B.RDY signal. Inverter 182 inverts the -B.RDY signal and inverter 184 returns this signal to the original level of the -B.RDY signal. The I.RDYWT signal is generated in response to the receipt by this module of the re-try status signal -B.RET, and indicates that the initiator module is ready and waiting for a re-try. Thus, upon the assertion of the -B.RDY signal, the I.RDYWT signal will be conducted through the A AND gate portion of the gate 174 to set the flip-flop 176 and create a -B-REQOUT signal if the particular module is waiting to re-try. The initiator waiting for a re-try can re-request the bus as soon as the responder indicates that it is ready, regardless of the state of the -B.PEND signal and regardless of other requests that might be outstanding, since those requests are rescinded as a result of the gating action associated with the assertion of -B.RDY into the B, C and D AND gate portions of the gate 174.

The AND/OR/INVERT gate 174 significantly enhances functionality without sacrificing performance. The flip-flops 170 and 172 are clocked on the B0 clock state signal, and flip-flop 176 is clocked on the B1 clock state signal, one clock state apart. The duration of the single bus state signal leaves a very short time to achieve the combination of signals needed to establish the arbitration fairness. Also, despite the best efforts to avoid it, some clock skew will result. As a result of the timing involved in the preferred embodiment of the present invention, there is time only for one level of gating between the flip-flops 170 and 172 on one hand and the flip-flops 176 and 180 on the other hand. Only one logical gate can be used in between these flip-flops. The AND/OR/INVERT gate 174 supplies a relatively large number of usable input signals to achieve arbitration gating in roughly one gate delay time as opposed to other forms of gating which might require two or more sequential gates to achieve the logical arbitration function.

The function of gate 174 is particularly important because it allows the implementation of rescinding requests, which is of considerable advantage. When the goal is to maximize useful throughput of the bus, an important necessity is to minimize unnecessary bus cycles which are wasted on unsuccessful re-tries. To maximize useful throughput it is therefore necessary to minimize unsuccessful re-tries. To minimize unsuccessful re-tries, the module waiting to re-try does not initiate its re-try until after the responder has become ready. However, there is a high probability in a multi-initiator computer system that at the point in time where the responder becomes ready one or more other initiators will be requesting the bus. If there is no means of rescinding these pre-existing requests, arbitration fairness will necessitate that the re-try request will be delayed until after those pre-existing requests have been serviced.

There is a reasonable probability that one or more of those pre-existing requests will access the very responder which has just become ready and therefore make it busy again, requiring yet another re-try by the waiting module before it gets bus control. Such an arrangement violates the concept of fairness set forth in the present invention in that a module that began its activity much sooner is delayed even longer. By rescinding pre-existing requests when a responder ceases being busy, the present invention has the advantage of allowing the re-try to occur as soon as possible with the highest possible probability of finding a non-busy responder.

The portion of the arbiter circuitry shown in FIG. 16B accomplishes the actual priority arbitration and generates the signals of bus mastership. Two important elements of the circuitry shown in FIG. 16B are multi-input AND gates 186 and 188. The fifteen bus request signals -B.REQ14-0 are conducted to the input terminals of each of these AND gates 186 and 188. Pull-up resistors 168 are connected to all connector pins including those which do not receive -B.REQOUT signals from modules of greater priority, as has been discussed in conjunction with FIG. 15. The signals appearing at the pins to which -B.REQOUT signals are not present from modules of higher priority appear to be negated (logically high) due to the pull-up of resistors since the -B.REQ14-0 signals are active low signals.

The AND gate 186 detects whether higher priority requests are outstanding, and thus determines whether this particular initiator module will win the arbitration. In addition to all -B.REQ14-0 signals, the -B.HOLD signal is also applied to one input terminal of the AND gate 186. The last input to the AND gate 186 is the inversion of the -B.REQOUT signal of this particular module, which is applied at point (a) from the circuitry shown in FIG. 16A. The output signal from AND gate 186 is thus created when this module is requesting the bus as a result of the presentation of a signal at point (a), there is no higher priority -B.REQ14-0 signal asserted, and -B.HOLD is not asserted.

The output signal from the AND gate 186 is supplied to a NOR gate 190 and to the D input terminal of a flip-flop 192. The flip-flop 192 is clocked on the B0 clock state signal. The flip-flop 192 clocks bus mastership when its Q-output is high and asserts a I.SBMSTR signal. The I.SBMSTR signal enables drivers from this module to drive the information transfer signals and the transfer control signals and also initiates a timing chain to gate appropriate information onto the bus at appropriate times.

Because the request from a module that has become bus master must be negated immediately after the module commences its cycle or cycles of bus mastership, the Q output signal from flip-flop 192 is routed to a NOR gate 194. The output signal from the NOR gate 194 is applied at point (b) and is used to reset flip-flops 170, 172, 176 and 180, which are involved in generating the -B.REQOUT signal (FIG. 16A). As soon as flip-flop 192 sets, flip-flops 170, 172, 176 and 180 will clear after one or two gate propagation delays (substantially less than one clock cycle) thereby negating the -B.REQOUT signal before the B1 state of the cycle when the module is bus master. A signal at the overriding input terminal S of the flip-flops 170, 172, 176 and 180 is used, to clear these flip-flops before the B1 bus state signal occurs. Therefore, the request out (-B.REQOUT) from this initiator module does not interfere with the generation of -B.PEND for the next cycle. This arrangement avoids spurious conditions when the bus is run at relatively high speeds.

The other signal applied to the OR gate 194 is an internal reset signal -I.RESET which is used at power on reset to make sure that a bus request is not generated upon powering up the system.

The generation of the -B.HOLD signal is accomplished by a flip-flop 196 which is clocked on the B1 clock state signal. The timing of the -B.HOLD signal is therefore equivalent to the timing of the -B.REQOUT signal which is also generated on the B1 clock state signal from flip-flop 180 (FIG. 16A) Gate 198 enables the generation of the -B.HOLD signal from the flip-flop 196. One of the input signals to the gate 198 is the -I.SB-HOLD signal generated by other control logic on the module when the module is involved in a multi-doubleword operation or a test and set or memory scrub operation. The assertion of the -I.SBHOLD signal occurs when it is recognized that the module should hold bus mastership for more than one consecutive bus cycle. Gate 198 accomplishes its gating function during the assertion of I.SBMSTR, since gate 198 receives the Q output signal from flip-flop 192. By gating the gate 198 in this manner, it is assured that this module does not assert -B.HOLD when it is not the bus master.

The output signal from the Q output of flip-flop 196 is routed back to one of the input terminals of NOR gate 190. The assertion of I.SBMSTR from the flip-flop 192 will reset -B.REQOUT and therefore, the output of gate 186 will no longer be high because one of the inputs to that gate, namely the -B.REQOUT signal from this module, will be negated. Accordingly, if this module is asserting -B.HOLD, the signal from flip-flop 196 to the gate 190 forces the flip-flop 192 to remain set so that this module remains the master for the duration of the assertion of the -B.HOLD signal.

At the end of any transaction in which this initiator module is bus master, the flip-flop 192 changes states and negates I.SBMSTR by the gating sequence through flip-flop 200, and gates 202, 204 and 206. The normal turn-off signal for flip-flop 192 is derived from the Q output signal from flip-flop 200. The I.SBMSTR signal from the Q bar output flip-flop 192 is applied to the D input terminal of flip-flop 200. On the clock state signal B1, flip-flop 200 is set, and the Q output signal from flip-flop 200 is applied to one input terminal of gate 202. Thus, as soon as the module becomes bus master, i.e. when I.SBMSTR is asserted, flip-flop 200 begins the turnoff process on the very next clock state signal (B1). The Q output signal from flip-flop 200 is applied to one input terminal of the AND gate 202. The other input signal to the AND gate 202 is the Q output signal from flip-flop 196. The Q output signal from flip-flop 196 is asserted whenever the -B.HOLD signal is not asserted. Assuming that -B.HOLD is not asserted, an output signal from gate 202 is present at the input terminal to AND gate 204 shortly after the commencement of the B1 clock state signal. At the B3 clock state signal, which is applied as the other input to AND gate 204, an output signal from gate 204 is applied to the input of gate 206, and the output signal from gate 206 sets or clears flip-flop 192, thus turning off the flip-flop 192 at the B3 clock state signal. An internal reset signal -I.RESET is also applied to the gate 206. The internal reset signal will also turn off the flip-flop 192. By applying the B3 clock state signal as one input to NOR gate 204, it is assured that the turnoff occurs at the end of a bus cycle rather than in mid-cycle so that proper hold times are attained for the last cycle of the transaction. Applying the Q output signal from flip-flop 196 to the input terminal of AND gate 202 assures that flip-flop 192 will not be turned off so long as a -B.HOLD signal is asserted. The assertion of the I.RESET signal also clears flip-flops 196 and 200.

The gates 186, 188 and 198 are actually implemented in a programmable array logic chip of the type PAL-20L8A, which is manufactured by Monolithic Memories Inc., National Semiconductor Corp. and others. A programmable array logic device allows the 17 input signals to gate 186 and the 15 input signals to gate 188 to be logically ANDed together.

The portion of the arbiter circuit shown in FIG. 16C serves as means for generating the -B.PEND signal. The purpose of the -B.PEND signal is to prevent new bus requests from initiators from being asserted when two or more requests are already pending and to implement the arbitration fairness among contending initiators. Gate 188 (FIG. 16B) detects any relevant pending requests from higher priority initiators. Since the -B.REQ signals from the initiators are active low signals an AND function will produce an output only if all of the -B.REQ14-0 signals are negated. When all of the -B.REQ14-0 signals are negated, meaning that there is no outstanding request, or that this particular module to which the arbiter circuit is associated is not making a request, which is the other input signal at point (a) passed through an inverter 212 to the OR gate 208, then -B.PEND will not be generated as a result of the OR gate 208 providing a low output signal at point (d) (FIG. 16B). If both input signals to the NOR gate 208 are low, meaning that this module has asserted a request and there is at least one other pending request asserted by another module of higher priority, the output of gate 208 will be a high signal at point (d). The high signal at point (d) will generate the -B.PEND signal as a result of the action of the NOR gate 214 as shown in FIG. 16C.

The assertion of the -B.PEND signal is also accompanied by the latching of the Q output of a flip-flop 216. Flip-flop 216 records on the B0 clock state signal, the fact that -B.PEND has been asserted. The flip-flop 216 has its Q bar output wrapped back in a feedback path to the overriding set input, and this feedback latches the state of the output signal of gate 208 (FIG. 16B) until such time as the module does become the bus master. When the module becomes the bus master, flip-flop 200 (FIG. 16B) sets on the clock bus state signal B1 and its Q bar output at point (e) is supplied to the reset of flip-flop 216. Accordingly -B.PEND is negated in this module one bus state clock signal into the period in which the module becomes bus master. It is important to separately latch the state of -B.PEND in flip-flop 216 because when a request from this module has been rescinded due to the assertion of -B.RDY, arbitration fairness will be violated among the modules with pending requests if the -B.PEND signal was negated. So by setting flip-flop 216, the assertion of -B.PEND will not be negated as a result of the Q output signal from flip-flop 216 being conducted through OR gate 218 to the gate 214.

As explained, it is theoretically possible for a module to encounter a prolonged number of busy status responses and wait an excessive amount of time during re-tries even though both the initiator and responder are functioning properly. The means by which this possibility is prevented is by having a series of flip-flops 220, 222, 224 and 226 detect and count the occurrence of re-tries to the same transaction. The flip-flops 220, 222, 224, 226 and 228 have been chosen to implement the concept that, after the second unsuccessful re-try on the same transaction, the third re-try will always succeed. Empirically, this arrangement has been determined to produced a low wastage of bus cycles. However, the exact number of re-tries is a parameter which only affects the maximum waiting time and maximum wastage of bus bandwidth. It does not affect the functional characteristics of the bus so long as the count is less than a very high number.

The signal at point (c) indicates the assertion of a -B.REQOUT signal from this module, and it is applied to one input of an AND gate 230. A signal I.BUSY is asserted by the internal circuitry of the module at the time that a bus transaction is needed. The bus coupler goes logically busy until the transaction has been completed regardless of the number of re-tries which might be needed. The I.BUSY signal is ordinarily the same signal that would generate wait states to the on board processor during the time that the transaction was waiting, although this may not be the case. A circuit (not shown) will terminate the assertion of the I.BUSY signal after a predetermined number of clock cycles has occurred, for example 512. The expiration of this number of clock pulses generally indicates an attempt to address a malfunctioning destination which accepted the read request but never generated a reply.

The first flip-flop 220 sets on clock state signal B1 during which this module is issuing a request for any transaction, as is indicated by the signal from the AND gate 230. The wrap around signal path from the Q bar output of flip-flop 220 to the overriding set input causes the flip-flop 220 to remain set until the module goes not busy, i.e., negation of I.BUSY, which will occur when the transaction has been successfully completed. Gate 232 combines the Q output of flip-flop 220 with a signal which is the inversion of the signal at point (c), due to the effects of the inverter 234. Since the signal originating from flip-flop 180 (FIG. 16A) at point (c) negates as soon as the module becomes bus master, regardless of whether a successful completion of a transaction occurs or whether it is simply an attempt for a re-try, flip-flop 222 sets on clock state signal B1 as soon as the module has become bus master once during a transaction. Flip-flop 222 also includes a wrap around feedback path to keep itself set. Gate 236 combines the asserted signals at point (c) with the Q output signal from flip-flop 222 so that on the next assertion of a bus request flip-flop 224 sets. The second assertion of a request will only be present when a busy was still asserted by the address responder, and therefore a re-try was necessary. The -B.RDY signal allows the re-try to proceed. Therefore, flip-flop 224 indicates that the first re-try (second attempt) of this transaction has begun. Upon the negation of the second bus request signal indicated by the signal at point (c) flip-flop 226 sets indicating that the actual bus mastership for the first re-try has occurred. Since the only condition under which there could be another request while busy remains continuously asserted, after flip-flop 226 has already set, is if the first re-try did not complete successfully and a second re-try is necessary, the signal at point (c) to the AND gate 240 indicates that a second re-try is necessary and that the assertion of -B.RDY allows the second re-try to begin. Flip-flop 228 is set which again remains for the duration of the busy condition and supplies its Q output signal to one of the input terminals of gate 218.

The fact that a second re-try is necessary, and the assertion of -B.RDY allows a second re-try to begin, results in the setting of flip-flop 228 which supplies the Q output signal to gate 218 for the duration of the busy condition. The condition related to -B.RDY will be resolved through the AND/OR/INVERT gate 174 (FIG. 16A) resulting in flip-flop 180 being set at a time when the flip-flop 226 is already set. Hence, gate 240 will go true on the subsequent bus clock state signal B1, flip-flop 228 will be set and the signal from the Q output of flip-flop 228 will conduct through the OR gate 218 and the NOR gate 214 to result in the assertion of -B.PEND. From this time on until the module successfully completes the transaction, -B.PEND will remain asserted. The assertion of -B.PEND will prevent any subsequent initiators from beginning a bus request and since eventually all pending responses will be completed, bus mastership will be eventually guaranteed by this module. In most cases, the second re-try will be successful and therefore this redundant assertion of -B.PEND will have minimal if any affect on the bus throughput. If, however, the second re-try fails, -B.PEND will prevent any further initiator activity from causing the designated responder to go busy again and therefore on the following receipt of -B.RDY signal, hence the third re-try signal, this module is guaranteed success in its transaction. An upper bound is therefore placed on how long any one initiator module can wait regardless of bus activity or interference between modules. It does this in a manner which in normal operation does not reduce the available bandwidth of the bus and thus is a very useful feature. In most cases, the functionality of the circuitry provided by the flip-flops 220, 222, 224, 226 and 228 will probably not be required, unless there is a very high bus load.

The circuitry of a typical responder arbiter 162 (FIG. 2) is shown collectively by FIGS. 16D, 16B and 16E. FIG. 16D is connected at points (a) and (b) to similar points on FIG. 16B. FIG. 16E is connected at points (d) and (b) to FIG. 16B.

In responder arbiters, only responses are initiated, and this fact is exhibited by the assertion of a I.RESP signal indicating that a responder wishes to request the bus. The I.RESP signal is applied to a flip-flop 242, which is set on the bus state clock signal B0 and its Q bar output applied to one input terminal of a NOR gate 244, as shown in FIG. 16D. Since responders do not participate in the inhibition of requests due to the assertion of -B.PEND, the -B.PEND signal is not one of the signals applied to the NOR gate 244. Similarly, -B.RDY is not brought into a responder arbiter because responder arbiters do not rescind their requests upon the occurrence of a -B.RDY. Further still, ready wait signals (I.RDYWT-FIG. 16A) are not considered because responses from responders are not re-tried. Accordingly, the only inputs to the NOR gate 244 are the Q bar output signal from flip-flop 242 and the Q bar output from flip-flop 180. Flips-flops 176 and 180 in FIG. 16D have the same function as has been previously described in conjunction with FIG. 16A. Accordingly, responder arbiters do not delay the assertion of bus requests due to -B.PEND and do not rescind bus requests due to the assertion of -B.RDY, and do not re-try since response cycles never encounter a busy destination.

The function of the circuit portion shown in FIG. 16B is as has previously been described in conjunction with an initiator arbiter.

The function of the circuit portion shown in FIG. 16E is considerably simplified. Since responders do not re-try there is no reason to bound or limit bus mastership with respect to a responder. Accordingly, flip-flop 216 and NOR gate 214 in FIG. 16E function as has been described in conjunction with the similar elements in FIG. 16C. Since there is no bound or limitation with respect to re-tries in a responder module, the Q output signal from flip-flop 216 is applied directly to one input of the NOR gate 214.

A number of substantial improvements are available as a result of the present invention. The nature and details of these improvements have been described above with a degree of specificity. It should be understood, however, that the description has been made by way of preferred example and that the invention itself is defined by the scope of the appended claims.

What is claimed is:

1. In a computer system comprising a plurality of modules and bus means commonly connected to all of the modules for conducting information signals between the modules, each module including means for transmitting information signals as a transfer over the bus means and while doing so functioning as a master module, each module also including means for receiving the transfer of information signals from the bus means and while doing so functioning as a slave module, a predetermined number less than all of the plurality of modules including means for initiating a transfer over the bus means in response to exogenous or internally generated events and thereby functioning as an initiator module, each module of the plurality other than the initiator modules including means for transmitting a transfer on the bus means only in response to a previous transfer transmitted by an initiator module and thereby functioning as a responder module, means associated with each module for assigning a predetermined priority to each module, the priorities of each module being different from one another, each responder module having a higher priority than any initaitor module, mnans associated with each module for asserting a request signal indicative of the predetermined priority of that module upon that module desiring to become a master module for transmitting a transfer over the bus means, and an improved arbitration means connected to the bus means and responsive to the request signals and operative during each of a plurality of sequential arbitration time periods for determining which of the plurality of modules asserting request signals is to be granted exclusive access to the bus means as a master module for a bus predetermined time period to transmit a transfer to an addressed slave module, said improved arbitration means further comprising:
 means responsive to a plurality of request signals and operative for issuing a pending signal upon receipt of two request signals asserted during one arbitration period;
 means associated with each initiator module not previously asserting a request signal and operative in response to the assertion fo the pending signal for inhibiting and assertion of its request signal until the pending signal is negated;
 means associated with each one responder module for asserting a re-try signal upon detecting an attempt by an initiator module to transmit a transfer to the one responder module while the one responder module is busy processing a previously transmitter transfer, each responder module asserting a re-try signal becoming a busy responder module;

means associated with each initiator module which unsuccessfully attempted a transfer to a busy responder module for recognizing the re-try signal asserted by the busy responder module, each initiator module recognizing the re-try signal becoming a waiting initiator module;

means associated with each busy responder module for asserting a ready signal when the busy responder module ceases being busy upon completing the processing of the previously transmitted transfer;

means associated with each waiting initiator module for asserting its request signal upon receipt of the ready signal;

means associated with each initiator module which is not a waiting initiator module for rescinding any request signal it may have been asserting upon the receipt of the ready signal; and means operative during each predetermined arbitration period and responsive to the request, pending and ready signals for first granting exclusive access to the bus means to responder modules asserting request signals in the order of their predetermined priorities without regard to the assertion of the request and pending signals from initiator modules, and for thereafter granting exclusive access to the bus means to those initiator modules asserting request signals in the order of their predetermined priorities durigg the predetermined arbitration period when no request signals from responder modules are asserted to thereby give priority to waiting initiator modules over the other initiator modules and to give priority to the non-waiting initiator modules on the basis of precedence in time of their asserted requests while the pending signal is asserted.

2. An invention as defined in claim 1 further comprising:
means for maintaining the assertion of the pending signal during the temporary rescission of request signals from non-waiting initiator modules.

3. An invention as defined in claim 2 further comprising:
means for asserting a hold signal upon a module obtaining bus exclusive access for the purpose of accomplishing a transaction which requires more than one bus period to accomplish a series of sequential transfers and wherein:
the arbitration means is responsive to the hold signal and is operative to prohibit the granting of bus exclusive access to a different module until negation of the hold signal.

4. An invention as defined in claim 1 further comprising:
means for asserting a hold signal upon a module obtaining bus exclusive access for the purpose of accomplishing a transaction which requires more than one bus period to accomplish a series of sequential transfers, and wherein:
the arbitration means is responsive to the hold signal and is operative to prohibit the granting of bus exclusive access to a different module until negation of the hold signal.

5. An invention as defined in claim 1 further comprising:
means for counting the number of times a request signal is asserted by a waiting initiator module before it is successful in transmitting the transfer waiting to transmit, and for asserting the pending signal after the count has exceeded a predetermined number, and for maintaining the pending signal until the waiting initiator module whose request signals were counted is granted exclusive access to the bus means.

6. An invention as defined in claim 1 wherein:
a ready signal is supplied to all waiting initiator modules from each responder module which ceases being busy.

7. An invention as defined in claim 1 wherein:
the means for asserting the request signals, for asserting the pending signal, for asserting the re-try signal, for asserting the ready signal, for temporarily rescinding the request signals, and for granting exclusive access to the bus means, are each associated with each module appropriate to the module type asserting such signals.

8. An invention as defined in claim 1 wherein:
the means for asserting the request signals, for asserting the pending signal, for asserting the re-try signal, for asserting the ready signal, for temporarily rescinding the request signals, and for granting exclusive access to the bus means, are included in each module appropriate to the module type asserting such signals.

9. An invention as defined in claim 1 wherein:
each module is physically connected to the bus means by means including an electrical connector, and
the electircal connectors are electrically interconnected with one another to establish the priority of each module according to the physical connector to which the module is connected 10. An invention as defined in claim 9 wherein each request signal from a module of higher priority is conducted to each module of lower priority.

11. An invention as defined in claim 1 further comprising:
means associated with each slave module and responsive to the transfer of information signals for providing a status signal indicative of the status of the transfer by the slave module, and wherein:
the periods of the bus means and of the arbitration means are at regular and uniform length time intervals, each time interval being a bus cycle;
the means for asserting the request and ready and re-try signals do so at predetermined points in each bus cycle;
the means for arbitrating bus exclusive access does so during a single bus cycle;
the first transfer of information signals over the bus means at one bus cycle is accomplished by the master module whose exclusive access to the bus means was established on the immediately preceding cycle; and
the means for supplying the status signal does so on the bus cycle after the one cycle in which the transfer of information signals occurs.

12. An invention as defined in claim 11 wherein:
the bus means transfers information signals on a split transactional basis, wherein the information signals transferred in a request for a read transaction is transferred in a bus cycle which is separated by at least one complete bus cycle from the bus cycle in which the read information is transferred back.

13. An invention as defined in claim 1 wherein:
the periods of the bus means and of the arbitrating means are at regular uniform length time intervals, each time interval being a bus cycle;
the information signals include a command for a read/modify/write operation which causes a memory of a responder module to functionally read the original data at a specific memory location and write predetermined data to the location and write the original data back to the module asserting the read/modify/write command; and further comprising:
means for accomplishing a predetermined test and set operation at a predetermined location in a memory of a responder module by transferring a read/modify/write command from an initiator module to the memory of the responder module in one bus cycle; and wherein
the memory of the responder module includes means for performing the read/modify/write command and for transferring the original data back during a bus cycle subsequent to the one cycle.

14. An invention as defined in claim 13 wherein at least one responder module to which the test and set operation is addressed includes a cache memory having coherence logic, and the means for arbitrating bus exclusive access further establishes a null condition over the bus means in the bus cycle next immediately following the bus cycle in which the command for a read/modify/write operation was transmitted to the cache memory to permit time for the coherence logic of the cache memory to operate.

15. In a computer system comprising initiator modules including at least one which is processor, responder modules including at least one which is a memory, a bus commonly connecting the modules, means for establishing bus cycles during which separate transfers of information signals are communicated between the modules, and means for arbitrating exclusive access of the bus to establish selected communication paths between a selected initiator and a responder addressed by the selected initiator; and improved means for accomplishing test and set operations in the memory, comprising in combination:
means for transferring a command for a read/modify/write operation to the memory during one bus cycle;
said memory further includes means for performing a read/modify/write operation in response to the read/modify/write command to read the original data at an addressed memory location and write predetermined data to the addressed location and write the original data back, the writing of the original data back occurring during a bus cycle subsequent to the one bus cycle; and
said bus arbitrating means inhibiting communication over the bus for a bus cycle after the one bus cycle to allow the memory to write the predetermined data to the addressed location during the read/modify/write operation without being addressed by another command until after the predetermined data has been written to the addressed memory location.

16. An invention as defined in claim 15 wherein said means for arbitrating exclusive access to the bus creates a null communication condition on the bus during the next bus cycle which immediately follows the one bus cycle.

17. An invention as defined in claim 15 wherein said computer system also includes means for supplying signals over the bus indicative of predetermined bytes of data which are enabled for computer operations in association with a transfer of that data, and the memory further includes means for correcting errors in the original data contained in memory locations; and said improvement further includes means for accomplishing a memory scrub operation as a specific version of a test and set operation, comprising:
means associated with the memory and receptive of the byte enable signals for causing error corrected original data to be written back into the addressed memory location rather than writing back the predetermined data in performing the read/modify/write operation.

18. In a computer system comprising a plurality of modules and bus means commonly connected to all of the modules for conducting information signals between the modules, each module including means for transmitting information signals as a transfer over the bus means and while doing so functioning as a master module, each module also including means for receiving the transfer of information signals from the bus means and while doing so functioning as a slave module, a predetermined number less than all of the plurality of modules including means for initiating a transfer over the bus means in response to exogenous or internally generated events and thereby functioning as an initiator module, each module of the plurality other than the initiator modules including means for transmitting a transfer on the bus means only in response to a previous transfer transmitted by an initiator module and thereby functioning as a responder module, means associated with each module for assigning a predetermined priority to each module, the priorities of each module being different from one another, each responder module having a higher priority than any initiator module, means associated with each module for asserting a request signal indicative of the predetermined priority of that module upon that module desiring to become a master module for transmitting a transfer over the bus means, and an improved arbitration means connected to the bus means and responsive to the request signals and operative during each of a plurality of sequential arbitration time periods for determining which of the plurality of modules asserting request signals is to be granted exclusive access to the bus means as a master module for a predetermined time period to transmit a transfer to an addressed slave module, said improved arbitration means further comprising:
means responsive to a plurality of request signals from initiator modules for issuing a pending signal upon receipt of two request signals asserted during one arbitration period;
means associated with each initiator module not previously asserting a request signal and operative in response to the assertion of the pending signal for inhibiting the assertion of its request signal until the pending signal is negated;
means associated with each responder module for asserting its request signal without regard to the assertion of the pending signal;
means operative during each predetermined arbitration period and responsive to the request and pending signals for first granting exclusive access to the bus means to responder modules asserting request signals in the order of their predetermined priorities without regard to the assertion of the pending signal or request signals from initiator modules, and for thereafter granting exclusive access to the bus means to each of a plurality of initiator modules asserting request signals during the one arbitration period in the order of their predetermined priorities until all of the initiator modules asserting request signals during the one arbitration period have been granted bus exclusive access and before request signals from any other initiator modules are asserted.

19. An invention as defined in claim 18 further comprising:
    means for asserting a hold signal upon a module obtaining bus exclusive access for the purpose of accomplishing a transaction which requires more than one bus period to accomplish a series of sequential transfers, and wherein:
    the arbitration means is responsive to the hold signal and is operative to prohibit the granting of bus exclusive access to a different module until negation of the hold signal.

20. An invention as defined in claim 18 wherein:
    the periods of the bus means and of the arbitration means are at regular and uniform length time intervals, each time interval being a bus cycle;
    said means for asserting the pending signal operatively negates the pending signal one bus cycle before the last module of the plurality of modules which asserted request signals during the one arbitration period is granted exclusive access to the bus means, and
    said initiator modules which were inhibited from asserting their request signals during the assertion of the pending signal all simultaneously assert their request signals during the bus cycle when said last one module is granted exclusive access to the bus means.

21. In a computer system comprising a plurality of modules and bus means commonly connected to all of the modules for conducting information signals between the modules, each module including means for transmitting information signals as a transfer over the bus means and while doing so functioning as a master module, each module also including means for receiving the transfer of information signals from the bus means and while doing so functioning as a slave module, a predetermined number less than all of the plurality of modules including means for initiating a transfer over the bus mans in response to exogenous or internally generated events and thereby functioning as an initiator module, each module of the plurality other than the initiator modules including means for transmitting a transfer on the bus means only in response to a previous transfer transmitted by an initiator module and thereby functioning as a responder module, means associated with each module for assigning a predetermined priority to each module, the priorities of each module being different from one another, each responder module having a higher priority than any initiator module, means associated with each module for asserting a request signal indictive of the predetermined priority of that module upon that module desiring to become a master module for transmitting a transfer over the bus means, and an improved arbitration means connected to the bus means and responsive to the request signals and operative during eaoh of a plurality of sequential arbitrtion time periods for determining which the plurality of modules asserting request signals is to be granted exclusive access to the bus means as a master module for a predetermined time period to transmit a transfer to an addressed slave module, said improved arbitration means further comprising:
    means associated with each one responder module for asserting a re-try signal upon detecting an attempt by an initiator module to transmit a transfer to the one responder module while that one responder module is busy processing a previously transmitted transfer, each responder module asserting a re-try signal becoming a busy responder module;
    means associated with each initiator module which unsuccessfully attempted to transfer to a busy responder module for recognizing the re-try signal asserted by the busy responder module, each initiator module recognizing the re-try signal becoming a waiting initiator module;
    means associated with each busy responder module for asserting a ready signal when the busy responder module ceases being busy upon completing the processing of the previously transmitted transfer;
    means associated with each waiting initiator module for asserting its request signal upon receipt of the ready signal;
    means associated with each initiator module which is a non-waiting initiator module for rescinding any request signal it may have been asserting upon the receipt of the ready signal to allow waiting initiator modules precedence in the order of their predetermined priorities over non-waiting initiator modules.

22. An invention as defined in claim 21 further comprising:
    means for counting the number of times a request signal is asserted by a waiting initiator module before it is successful in transmitting the transfer waiting to be transmitted, and for asserting a pending signal after the count has exceeded a predetermined number; and
    means associated with each initiator module and operative in response to the pending signal for preventing the assertion of a request signal until the pending signal is negated, thereby preventing the assertion of new request signals from initiator modules until the waiting initiator module is granted exclusive access to the bus means.

* * * * *